US010371876B2

(12) United States Patent
Menezes et al.

(10) Patent No.: US 10,371,876 B2
(45) Date of Patent: Aug. 6, 2019

(54) REFLECTIVE DIFFRACTIVE GRATINGS WITH VARIABLE REFLECTIVITY AND DISPLAY SYSTEMS HAVING THE SAME

(71) Applicant: Magic Leap, Inc., Plantation, FL (US)

(72) Inventors: Marlon Edward Menezes, Austin, TX (US); Jeffrey Dean Schmulen, Austin, TX (US); Neal Paul Ricks, Plantation, FL (US); Victor Kai Liu, Mountain View, CA (US); Zongxing Wang, Austin, TX (US); David Carl Jurbergs, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/042,996

(22) Filed: Jul. 23, 2018

(65) Prior Publication Data
US 2018/0329132 A1 Nov. 15, 2018

Related U.S. Application Data

(63) Continuation of application No. 15/954,419, filed on Apr. 16, 2018.

(60) Provisional application No. 62/486,873, filed on Apr. 18, 2017.

(51) Int. Cl.
F21V 8/00 (2006.01)
G02B 27/01 (2006.01)

(52) U.S. Cl.
CPC ......... G02B 6/0016 (2013.01); G02B 6/0065 (2013.01); G02B 6/0076 (2013.01); G02B 27/0172 (2013.01); G02B 2027/0125 (2013.01)

(58) Field of Classification Search
CPC .............. G02B 6/0016; G02B 27/0172; G02B 6/0076; G02B 6/0065; G02B 2027/0125
See application file for complete search history.

(56) References Cited

U.S. PATENT DOCUMENTS

| 3,497,377 A | 2/1970 | Allingham |
| 6,850,221 B1 | 2/2005 | Tickle |
| 6,986,983 B2 | 1/2006 | Wei et al. |
| D514,570 S | 2/2006 | Ohta |

(Continued)

FOREIGN PATENT DOCUMENTS

WO    WO 2018/194987    10/2018

OTHER PUBLICATIONS

International Search Report and Written Opinion for PCT Application No. PCT/US18/27818, dated Jun. 29, 2018.

(Continued)

Primary Examiner — Ryan A Lepisto
(74) Attorney, Agent, or Firm — Knobbe, Martens, Olson & Bear, LLP

(57) ABSTRACT

In some embodiments, compositions and methods comprising reflective flowable materials, e.g., reflective liquids including reflective inks and/or liquid metals, are described. In some embodiments, a surface is contacted with a reflective flowable material, thereby forming a reflective layer on the surface. In some embodiments, the surface is a surface of a waveguide, for example a waveguide for a display device, and the flowable material coats surfaces of protrusions on the surface to form reflective diffractive optical elements. Some embodiments include a display device comprising a reflective layer of reflective flowable material.

21 Claims, 14 Drawing Sheets

(56) References Cited

U.S. PATENT DOCUMENTS

| | | | |
|---|---|---|---|
| 7,315,419 B2 | 1/2008 | Taira et al. | |
| 7,430,076 B2* | 9/2008 | Sato | G02B 5/1819 |
| | | | 359/566 |
| 8,061,882 B2 | 11/2011 | Bita et al. | |
| 8,472,118 B2 | 6/2013 | Guigan et al. | |
| 8,861,086 B2* | 10/2014 | Liu | B29D 11/00269 |
| | | | 356/305 |
| 8,950,867 B2 | 2/2015 | Macnamara | |
| 9,081,426 B2 | 7/2015 | Armstrong | |
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 2009/0067196 A1 | 3/2009 | Takada et al. | |
| 2011/0277361 A1 | 11/2011 | Nichol et al. | |
| 2012/0062998 A1 | 3/2012 | Schultz et al. | |
| 2012/0127062 A1 | 5/2012 | Bar-Zeev et al. | |
| 2013/0082922 A1 | 4/2013 | Miller | |
| 2013/0125027 A1 | 5/2013 | Abovitz | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0306866 A1 | 10/2014 | Miller et al. | |
| 2015/0086163 A1 | 3/2015 | Valera et al. | |
| 2015/0103306 A1 | 4/2015 | Kaji et al. | |
| 2015/0116836 A1 | 4/2015 | Yasuda et al. | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0033784 A1* | 2/2016 | Levola | G02B 27/4205 |
| | | | 385/37 |
| 2016/0116739 A1* | 4/2016 | Tekolste | G02B 27/0172 |
| | | | 385/31 |
| 2016/0185990 A1 | 6/2016 | Cho et al. | |
| 2016/0302305 A1* | 10/2016 | Chang | H05K 1/097 |
| 2018/0299607 A1 | 10/2018 | Menezes et al. | |

OTHER PUBLICATIONS

ASTM Designation: D3359-09$^{E2}$: "Standard Test Methods for Measuring Adhesion by Tape Test[1]," Jun. 2014.

Brett, et al.: "Reactive Silver Inks for Patterning High-Conductivity Features at Mild Temperatures," J. Am. Chem.Soc. 2012, 134, 1419-1421.

Micodrop—Materials by Inkjet Technology, http://www.microdrop.com/microdrop.html, dated Nov. 30, 2016.

\* cited by examiner

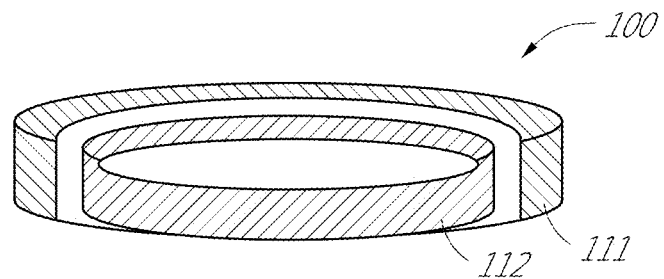
FIG. IIA
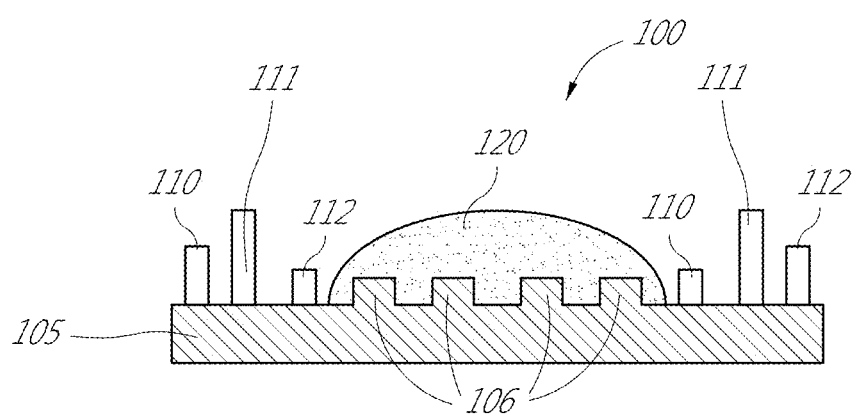
FIG. IIB

REFLECTIVE DIFFRACTIVE GRATINGS WITH VARIABLE REFLECTIVITY AND DISPLAY SYSTEMS HAVING THE SAME

PRIORITY CLAIM

This application is a continuation of U.S. application Ser. No. 15/954,419 filed on Apr. 16, 2018, titled "WAVEGUIDES HAVING REFLECTIVE LAYERS FORMED BY REFLECTIVE FLOWABLE MATERIALS", which claims priority under 35 U.S.C. 119(e) to U.S. Provisional Application No. 62/486,873 filed on Apr. 18, 2017. The entireties of each of these priority documents is incorporated herein by reference.

INCORPORATION BY REFERENCE

This application also incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to display systems. More particularly, some embodiments herein relate to methods and compositions comprising reflective flowable materials, for example, for forming a reflective layer on a waveguide.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 1100 featuring people, trees, buildings in the background, and a concrete platform 1120. The user also perceives that he "sees" "virtual content" such as a robot statue 1110 standing upon the real-world platform 1120, and a cartoon-like avatar character 1130 flying by and which seems to be a personification of a bumble bee. These elements 1130, 1110 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

Some aspects include a method of making an optical waveguide structure. The method may comprise forming a reflective optical element for a waveguide, in which forming the reflective optical element comprises providing a pattern of protrusions on a first surface of the waveguide depositing a reflective ink on surfaces of the protrusions. In some embodiments, the reflective ink is selectively deposited on a predetermined region of the first surface of the waveguide. In some embodiments, the depositing comprises administering the reflective ink from an inkjet, a microdispenser, or an applicator rod. In some embodiments, the reflective ink comprises a particle-free ink. In some embodiments, the reflective ink comprises, aluminum, silver, or a combination of these. In some embodiments, the reflective ink further comprises a binder, and wherein the binder is present in the reflective optical element. In some embodiments, the reflective optical element further comprises a surface accumulation. In some embodiments, the protrusions of the first surface comprise photoresist. In some embodiments, the first surface comprises a wall that defines at least a portion of the predetermined region onto which the reflective ink is selectively deposited. In some embodiments, the wall comprises a mechanical spacer configured to maintain space between the waveguide and an additional waveguide. In some embodiments, the protrusions the first surface are part of a grating, and wherein at least a portion of the reflective ink is disposed non-conformally on the grating, and wherein an interface between the reflective ink and the first surface is substantially free of gaps. In some embodiments, the reflective optical element is a diffractive optical element configured to redirect incident light at angles such that the light propagates through the waveguide by total internal reflection. In some embodiments, the reflective optical element is configured to reflect incident electromagnetic radiation with a reflectivity of at least 60%. In some embodiments, the reflective optical element is part of an incoupling optical element or a light distributing element configured to reflect electromagnetic radiation into the first waveguide. In some embodiments, the method further comprises forming an additional reflective optical element on an additional waveguide by depositing the reflective ink on a pattern of protrusions on a surface of the additional optical waveguide, in which the additional reflective optical element is configured to reflect incident electromagnetic radiation. The method may further comprise attaching at least the additional waveguide to a surface of the waveguide, thus producing a stack of waveguides.

Some aspects include a method of making a display device. The method may comprise forming a reflective layer of reflective ink on a first surface of an optical waveguide, in which the first surface comprises protrusions that form a grating. The reflective layer may be disposed on the first surface, thus making a reflective optical element. The method may comprise disposing the reflective optical element in a display device. In some embodiments, the reflective layer of reflective ink is disposed non-conformally on the first surface, and wherein an interface between the reflective layer and first surface is substantially free of gaps. In some embodiments, the reflective layer and protrusions form a diffractive optical element.

Some aspects include an optical waveguide structure. The optical wave guide structure may comprise a first waveguide comprising a first surface and a reflective layer of reflective ink disposed on the first surface. The reflective layer may comprise a binder. The reflective layer may be configured to reflect incident electromagnetic radiation at an interface into the first waveguide. In some embodiments, the reflective layer is substantially free of dispersed metal-containing particles. In some embodiments, the reflective layer comprises a surface accumulation. In some embodiments, the first surface comprises protrusions that, together with the reflective layer, are part of a reflective diffractive grating. In some embodiments, the reflective layer reflects the incident electromagnetic radiation with a reflectivity of at least 60%. In some embodiments, the reflective layer and protrusions form an incoupling optical element configured to redirect incident light at angles such that the light propagates through the first waveguide. In some embodiments, the optical waveguide structure further comprises a second waveguide and a third waveguide, in which the second waveguide is configured to output a different range of wavelengths than the third waveguide. The first waveguide may be in optical communication with at least one of the second and third waveguides. Each of the first, second, and third waveguides may comprise a reflective layer of reflective ink disposed on a surface comprising protrusions, thus forming a reflective diffractive grating, in which the reflective diffractive grating of each waveguide is configured to redirect light of a different range of wavelengths. In some embodiments, the first surface comprises a wall that defines a boundary of the reflective layer, wherein the wall comprises a mechanical spacer configured to maintain space between the first waveguide and an other waveguide.

Some aspects include a display device comprising the optical waveguide structure described herein, for example in the preceding paragraph. In some embodiments, the device comprises a spatial light modulator configured to inject image information into the first waveguide.

Some aspects include a method of making a display device. The method may comprise making an optical waveguide or stack of optical waveguides comprising a reflective optical element as described herein, for example in the preceding paragraphs. The method may comprise disposing the optical waveguide or stack of optical waveguides in a display device.

Some aspects include a display device comprising a waveguide. The waveguide comprises a reflective diffractive optical element. The diffractive optical element comprises a plurality of protrusions on a surface of the waveguide; and a reflective layer on surfaces of the protrusions, wherein the reflective layer is formed of reflective flowable material. Examples of reflective flowable materials include reflective inks and liquid metals.

Some aspects include a method of making an optical device. The method comprises providing a waveguide comprising a plurality of surface protrusions; and forming a reflective layer on the surface protrusions by depositing a reflective flowable material on the surface protrusions. The surface protrusions and the reflective layer form a reflective diffractive optical element.

Additional example embodiments are provided below.

1. A method of making an optical waveguide structure, the method comprising:
forming a reflective optical element for a waveguide, wherein forming the reflective optical element comprises:
providing a pattern of protrusions on a first surface of the waveguide; and
depositing a reflective ink on surfaces of the protrusions.

2. The method of embodiment 1, wherein the reflective ink is selectively deposited on a predetermined region of the first surface of the waveguide.

3. The method of embodiment 2, wherein the depositing comprises administering the reflective ink from an inkjet, a microdispenser, or an applicator rod.

4. The method of any one of embodiments 1-3, wherein the reflective ink comprises a particle-free ink.

5. The method of any one of embodiments 1-4, wherein the reflective ink comprises, aluminum, silver, or a combination thereof.

6. The method of any one of embodiment 1-5, wherein the reflective ink further comprises a binder, and wherein the binder is present in the reflective optical element.

7. The method of any one of embodiments 1-6, wherein the reflective optical element further comprises a surface accumulation.

8. The method of any one of embodiments 1-7, wherein the protrusions of the first surface comprise photoresist.

9. The method of any one of embodiments 2-8, wherein the first surface comprises a wall that defines at least a portion of the predetermined region onto which the reflective ink is selectively deposited.

10. The method of embodiment 9, wherein the wall comprises a mechanical spacer configured to maintain space between the waveguide and an additional waveguide.

11. The method of any one of embodiments 1-10, wherein the protrusions the first surface are part of a grating, and wherein at least a portion of the reflective ink is disposed non-conformally on the grating, and wherein an interface between the reflective ink and the first surface is substantially free of gaps.

12. The method of any one of embodiments 1-11, wherein the reflective optical element is a diffractive optical element configured to redirect incident light at angles such that the light propagates through the waveguide by total internal reflection.

13. The method of any one of embodiments 1-12, wherein the reflective optical element is configured to reflect incident electromagnetic radiation with a reflectivity of at least 60%.

14. The method of any one of embodiments 1-13, wherein the reflective optical element is part of an incoupling optical element or a light distributing element configured to reflect electromagnetic radiation into the first waveguide.

15. The method of any one of embodiments 1-14, further comprising:
forming an additional reflective optical element on an additional waveguide by depositing the reflective ink on a pattern of protrusions on a surface of the additional optical waveguide, wherein the additional reflective optical element is configured to reflect incident electromagnetic radiation; and
attaching at least the additional waveguide to a surface of the waveguide,
thereby producing a stack of waveguides.

16. A method of making a display device, the method comprising:
forming a reflective layer of reflective ink on a first surface of an optical waveguide, wherein the first surface comprises protrusions that form a grating, and wherein the reflective layer is disposed on the first surface, thereby making a reflective optical element; and
disposing the reflective optical element in a display device.

17. The method of embodiment 16, wherein the reflective layer of reflective ink is disposed non-conformally on the first surface, and wherein an interface between the reflective layer and first surface is substantially free of gaps.

18. The method of embodiment 16 or embodiment 17, wherein the reflective layer and protrusions form a diffractive optical element.

19. An optical waveguide structure comprising;
a first waveguide comprising a first surface; and
a reflective layer of reflective ink disposed on the first surface,
wherein the reflective layer comprises a binder, and
wherein the reflective layer is configured to reflect incident electromagnetic radiation at an interface into the first waveguide.

20. The optical waveguide structure of embodiment 19, wherein the reflective layer is substantially free of dispersed metal-containing particles.

21. The optical waveguide structure of any one of embodiments 19-20, wherein the reflective layer comprises a surface accumulation.

22. The optical waveguide structure of any one of embodiments 19-21, wherein the first surface comprises protrusions that, together with the reflective layer, are part of a reflective diffractive grating.

23. The optical waveguide structure of any one of embodiments 19-22, wherein the reflective layer reflects the incident electromagnetic radiation with a reflectivity of at least 60%.

24. The optical waveguide structure of any one of embodiments 22-23, wherein the reflective layer and protrusions form an incoupling optical element configured to redirect incident light at angles such that the light propagates through the first waveguide.

25. The optical waveguide structure of any one of embodiments 19-24, wherein the optical waveguide structure further comprises a second waveguide and a third waveguide, wherein the second waveguide is configured to output a different range of wavelengths than the third waveguide, and wherein the first waveguide is in optical communication with at least one of the second and third waveguides,
wherein each of the first, second, and third waveguides comprises a reflective layer of reflective ink disposed on a surface comprising protrusions, thereby forming a reflective diffractive grating, wherein the reflective diffractive grating of each waveguide is configured to redirect light of a different range of wavelengths.

26. The optical waveguide structure of any one of embodiments 19-25, wherein the first surface comprises a wall that defines a boundary of the reflective layer, wherein the wall comprises a mechanical spacer configured to maintain space between the first waveguide and an other waveguide.

27. A display device comprising the optical waveguide structure of any one of embodiments 19-26.

28. The display device of embodiment 27, wherein the device comprises a spatial light modulator configured to inject image information into the first waveguide.

29. A method of making a display device, the method comprising:
making an optical waveguide or stack of optical waveguides comprising a reflective optical element according to any of embodiments 1-13; and
disposing the optical waveguide or stack of optical waveguides in a display device.

30. A display device comprising;
a waveguide comprising a reflective diffractive optical element, wherein the diffractive optical element comprises:
a plurality of protrusions on a surface of the waveguide;
a reflective layer on surfaces of the protrusions, wherein the reflective layer is formed of flowable material.

31. The display device of claim 30, wherein the reflective diffractive optical element forms an incoupling grating configured to incouple incident light into the waveguide.

32. The display device of claim 31, wherein the waveguide is one of a stack of waveguides, each of the stack of waveguides comprises an incoupling grating,
wherein, in a top-down view, incoupling gratings of different waveguides are laterally offset from one another.

33. The display device of claim 30, wherein the flowable material comprises a reflective ink.

34. The display device of claim 30, wherein the flowable material comprises a liquid metal.

35. The display device of claim 30, wherein the liquid metal is selected from the group consisting of: gallium; indium; mercury; gallium-indium eutectic; gallium-indium alloy; gallium indium tin alloy; Ga, In, Sn and Zn alloy; Ga, In, and Sn alloy; sodium-potassium alloy; gallium, indium and stannum; gallium-indium-zinc-copper metallic; and silver indium gallium.

36. The display device of claim 32, wherein the reflective layer comprises an oxide of a component of the liquid metal.

37. A method of making an optical device, the method comprising:
providing a waveguide comprising a plurality of surface protrusions; and
forming a reflective layer on the surface protrusions by depositing a reflective flowable material on the surface protrusions,
wherein the surface protrusions and the reflective layer form a reflective diffractive optical element.

38. The method of claim 37, further comprising providing a spatial light modulator, wherein the spatial light modulator is positioned to output light onto the reflective diffractive optical element.

39. The method of claim 37, wherein the flowable material comprises a reflective ink.

40. The method of claim 37, wherein the flowable material comprises a liquid metal.

BRIEF DESCRIPTION OF THE DRAWINGS

FIG. 11A shows a schematic perspective view of a confined area for forming a reflective layer from reflective flowable material on a pattern of protrusions in accordance with some embodiments.

FIG. 11B shows a schematic cross-sectional side view of the confined area of FIG. 11A for forming a reflective layer from reflective flowable material on a pattern of protrusions in accordance with some embodiments.

Figure 1:
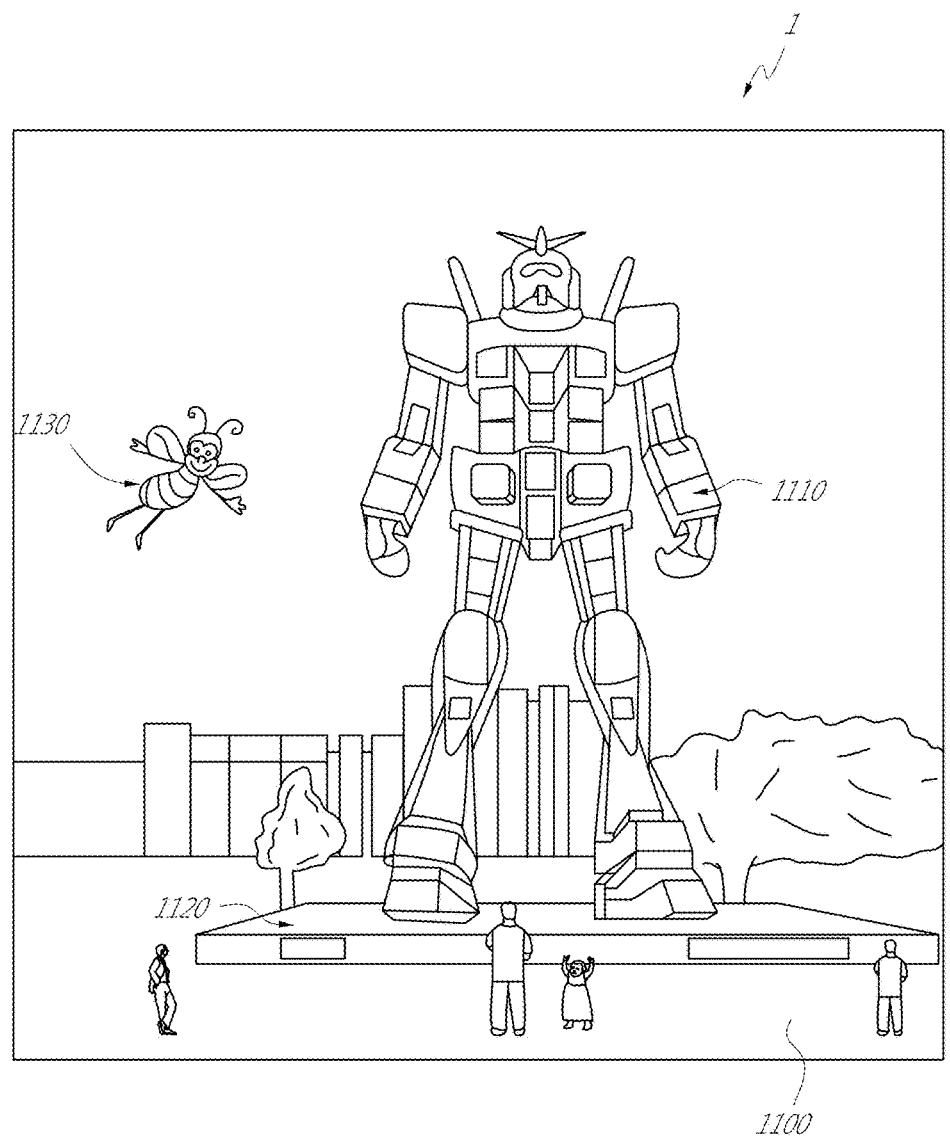
FIG. 1 illustrates a user's view of augmented reality (AR) through an AR device.

The drawings are provided to illustrate example embodiments and are not intended to limit the scope of the disclosure.

DETAILED DESCRIPTION

Waveguides may use optical elements to incouple external light and/or to redirect light propagating within the waveguide in desired directions. For example, the optical elements may take the form of diffractive gratings and/or faceted features. Some optical elements may work in the reflective mode, in which light incident on the optical element from one or more angles is both reflected and redirected such that it propagates away from the optical elements at a different desired angle. As disclosed herein, such waveguides may form parts of display systems. For example, the waveguides may be configured to incouple light containing image information, and to distribute and outcouple that light to a user.

Reflective optical elements may utilize reflective layers to achieve the desired light reflection. Reflective layers are conventionally deposited using a metallization process that comprises the vapor deposition of a metal layer. These conventional metallization processes may be time-consuming and may comprise a large number of steps. For example, in order to direct the metallization to desired locations on a waveguide, it may be necessary to align and overlie a waveguide with a mask in order to protect areas of the waveguide for which metallization is not desired. The mask, however, may be contaminated by the metallization and may require frequent cleaning. In addition, the vapor deposition itself may require a vacuum, which would further complicate the metallization process and increase its duration by requiring the deposition chamber to be pumped down for the deposition and then brought back up to atmospheric pressure for unloading.

In some embodiments, reflective layers are formed on a substrate surface using a reflective flowable material such as a reflective ink and/or liquid metal. The flowable material may be deposited by being flowed out of a dispenser onto the substrate surface. Preferably, the flowable material is flowable under standard conditions (e.g., at atmospheric pressure and room temperature). In some embodiments, the reflective flowable materials are in the liquid phase under deposition conditions (e.g., under standard conditions). In some embodiments, the flowable material may be heated to make it flowable. For example, the flowable material may be heated in a dispenser to maintain it in a flowable state (e.g., a liquid state).

The surface onto which the flowable material is deposited may include a pattern, such as a pattern comprising a plurality of protrusions and intervening recesses, which may form grating structures (e.g., a diffractive optical grating), and the reflective layers may coat (e.g., conformally coat or non-conformally coat) the surface of the pattern. It will be appreciated that the protrusions and recesses may be parts of the same structure in some embodiments. For example, neighboring protrusions may define recesses between them, and the reflective layer may coat both the protrusions and recesses. As a result, the structure may be described as having a pattern defined by recesses and/or a pattern defined by protrusions. In some embodiments, the reflective flowable materials may be localized in discrete regions of the substrate surface using vertically extending partitions on the substrate surface. In some embodiments, the reflective flowable materials may be applied using a dispenser (e.g., an ink jet or microdispenser) that outputs the flowable material at discrete locations on the substrate surface. The substrates on which the reflective flowable materials are deposited may be waveguides formed of optically transmissive material and configured to propagate light therein by total internal reflection.

Such metallization of a diffractive optical grating may increase the efficiency of the grating by increasing the amount of light incoupled to the waveguide/substrate. For example, a diffractive grating may be designed to incouple light into a waveguide over a given range of angles, but not every angle of light will incouple with equal efficiency which may lead to uniformity or other aberrations of light across all angles. A reflective coating on a grating structure may improve the incoupling efficiency of one or more angles of light incident upon the grating.

Advantageously, reflective flowable materials may be deposited directly onto the substrate surface and the deposition may offer greater speed and throughput relative to conventional approaches that involve vapor deposition. Preferably, the depositions are performed without needing a vacuum, e.g., at atmospheric pressure. It will be appreciated that conventional metallization processes may take a number of minutes to deposit a reflective layer, for example, about 5-30 minutes. Methods of making optical waveguides comprising reflective layers as described herein may be performed more quickly. For example, the flowable material may be deposited on the surface (e.g. surface of the waveguide) in a matter of seconds, for example, about 60 seconds or less, for example less than about 60 seconds, 55, 50, 45, 40, 35, 30 25, 20, 15, 10, 9, 8, 7, 5, 6, 5, 4, 3, 2, 1, 0.5, or 0.1 seconds, including ranges between any two of the listed values. Moreover, the reflective layers formed from the reflective flowable material may yield comparable or superior performance characteristics to reflective materials formed by vapor deposition. For example, liquid metals or reflective inks comprising electron inks in accordance with some embodiments have been found to yield reflectivity comparable or superior to reference vapor-deposited aluminum on both flat glass and flat resist (see, e.g., Example 2 below). In some embodiments, the reflective layers are a part of optical elements for waveguides in display devices. In some embodiments, the deposition of the reflective flowable material may be performed at room temperature or other relatively low temperature. This may prevent damage to surface features on a substrate, where those surface features are formed by material (e.g., resist) sensitive to heat. Furthermore, depositing reflective flowable materials in accordance with some embodiments herein may use material more efficiently, leading to less waste and reducing manufacturing costs. For example, with conventional evaporation-based methods, a material such as Ag would be deposited over the entire surface. On the other hand, a reflective flowable material (e.g., a reflective ink or liquid metal) may be readily selectively deposited on the desired regions only.

Reflective Inks, Liquid Metals, and Reflective Layers

As used herein, "reflective ink" refers to a class of inks that are flowable as applied and then, upon setting (e.g., upon "curing" or "drying"), forms a solid reflective layer. The reflective ink may comprise at least one constituent material, e.g., a metal, for example aluminum, silver, gold, platinum, chromium, or rhodium that remains present after setting, to confer at least some of the reflectivity of the reflective layer. The reflective ink may further comprise other substances such as binders. Without being limited by theory, it is contemplated that metals such as aluminum and silver are highly reflected in the visible spectrum, making them well-suited for reflective inks in accordance with some embodiments. In some embodiments, the reflective ink comprises a broadband reflector material, for example chromium, platinum, or rhodium.

The reflective ink in accordance with some embodiments may be formulated as a flowable material such as a liquid or gel, and upon setting may become less flowable, e.g., semi-solid, or solid, so as to form a stable reflective layer. In some embodiments, the viscosity of the reflective ink may be selected (e.g., may be varied between being a relatively thin liquid and a relatively viscous liquid), as appropriate, to obtain desired drying times, desired uniformity of application, desired concentrations of reflective materials, and/or desired control over the orientation of the reflective layer. In some embodiments, the reflective ink is formulated as a gel, which upon setting, becomes a more viscous or a solid reflective layer.

It will be recognized that different levels of viscosity may offer different advantages. For example, a relatively viscous flowable material (e.g., reflective ink) may be amenable to forming a desired three-dimensional feature such as a wall (which may be useful, for example, in confining the position of a subsequently-deposited flowable material that is flowable), and may be amenable to setting by air drying, so as to avoid the need for an oven bake, thereby reducing the thermal budget. On the other hand, a relatively thin ink may be amendable to forming a relatively thin and uniform reflective layer and may more easily flow between closely-spaced features, but setting may involve lengthier drying times or an oven bake. In some embodiments, once a deposited flowable material has set to form a reflective layer, one or more additional layers of flowable material are applied and set, so as to form a reflective layer of desired thickness as described herein.

In some embodiments, the reflective ink comprises binders, such as organic or inorganic binders. The binders may facilitate modifications of the viscosity of the reflective ink, setting of the reflective ink (for example, lowering the temperature and/or time for the reflective ink to set), and/or may facilitate adhesion of a reflective layer formed by the reflective ink to a surface such as that of a waveguide. In some embodiments, a reflective layer comprising a binder exhibits superior adherence to an underlying surface compared to a reflective layer of a similar material without a binder (for example, a binder-containing layer formed from reflective ink may be compared to a non-binding-containing layer that was deposited by vapor deposition).

In some embodiments, the reflective ink comprises silver. In some embodiments, the reflective ink is a silver-containing ink of the formula $|Ag(NH_3)_2|^+|C_2H_3O_2|^-$. Such an ink may be formulated as a particle-free or substantially particle free formulation, and upon application and drying, has been shown to yield materials with relatively high silver content (see Walker et al., "Reactive Silver Inks for Patterning High-Conductivity Features at Mild Temperatures", J. Am. Chem. Society 134: 1419-1421, the entirety of which is incorporated by reference herein, as to reflective inks). Without being limited by theory, it is contemplated that increasing the metal content (such as silver content) of the reflective ink corresponds to increased reflectivity of the reflective layer.

In some embodiments, the reflective ink comprises silver-containing particles, for example silver-containing colloids or silver-containing nanoparticles. In some embodiments, the reflective ink comprises silver-containing nanocrystals. Such nanocrystal-containing reflective inks may be formed via various approaches. For example, silver nanocrystals may be formed using a "bottom-up" approach in which silver atoms associate with nuclei such as silver salts (e.g., silver nitrate, $AgNO_3$). For example, silver nanocrystals may be formed using a surfactant-assisted synthesis approach in which silver crystals are grown from seeds and surfactants are added to alter the growth rate along one or more crystal planes so as to control the shape of the silver-containing crystals. As another example, silver-containing particles and/or colloids may be formed with the assistance of ultraviolet irradiation so as to control the shape and dimension of silver-containing particles such as nanoparticles and/or colloids. A number of approaches for synthesizing and using inks comprising silver particles are described in Rajan et al. "Silver nanoparticle ink technology: state of the art" Nanotechnol Sci. Appl. 2016; 9: 1-13, which is hereby incorporated by reference in its entirety.

In some embodiments, setting flowable materials may comprise drying and also annealing. For example, particle-containing reflective inks may be set after being deposited by drying and also annealing. Some particle-containing reflective inks may be annealed at a temperature well below the melting point of the metal in the reflective ink, which may be helpful for conserving thermal budget, and also to minimize heating and cooling times. For example, the melting point of silver is 960° C. In some embodiments, a reflective ink comprising metal-containing particles (e.g. silver-containing particles) is set, and the setting comprises annealing at a temperature below 960° C., for example a temperature below 960° C. that is at least about 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 450° C., 500° C., 550° C., 600° C., or 650° C., including ranges between any two of the listed values, for example about 150° C.-650° C., 150° C.-500° C., 150° C.-400° C., 150° C.-300° C., 150° C.-250° C., 150° C.-200° C., 200° C.-650° C., 200° C.-500° C., 200° C.-400° C., 200° C.-300° C., 200° C.-250° C., 250° C.-650° C., 250° C.-500° C., 250° C.-400° C., 250° C.-300° C., 300° C.-650° C., 300° C.-500° C., or 300° C.-400° C. In some embodiments, a reflective ink comprising metal-containing particles is set without annealing.

A reflective layer in accordance with some embodiments herein reflects at least one visible wavelength of incident electromagnetic radiation (e.g., light in the visible spectrum). The reflective layer may be formed from a flowable material, for example a flowable material that has set through drying and/or annealing. The reflective layer preferably reflects at least about 30% of at least one visible wavelength of incident electromagnetic radiation, for example at least about 30%, 35%, 40%, 45%, 50%, 55%, 60%, 65%, 70%, 75%, 80%, 85%, 90%, 95%, 98%, 99%, 99.5%, or 99.9% of the incident electromagnetic radiation, including ranges between any two of the listed values, for example about 30%-99%, 30%-95%, 30%-90%, 30%-80%, 30%-70%, 50%-99%, 50%-95%, 50%-90%, 50%-80%, 50%-70%, 70%-99%, 70%-95%, 70%-90%, or 70%-80% of the incident electromagnetic radiation. In some embodiments, the incident electromagnetic radiation comprises light of the visible spectrum. It will be understood that a flowable material itself may not necessarily possess the indicated reflective properties prior to setting, but, upon setting, the reflective layer formed from the flowable material will have the indicated reflective properties.

In some embodiments, a reflective layer formed of reflective ink as described herein has a reflectivity, adhesion, and/or pattern as described herein, while being structurally distinct from conventional reflective materials. In some embodiments, the reflective layer comprises structures such as binders and/or irregular accumulations of ink material as described herein, and has performance characteristics such as reflectivity, pattern fidelity, and adhesion suitable for forming optical elements of waveguides and/or display devices as described herein. Thus, in some embodiments, reflective layers formed from reflective inks as described herein offer patterning process advantages such as speed, throughput, and efficiency of patterning that are superior to conventional deposition methods such as vapor deposition (with or without a mask). In some embodiments, the reflective layer is on a waveguide comprising one or more surface protrusions, which may form an optical grating as described herein. In addition, the layers may have a reflectivity suitable for redirecting light for waveguides such as those in display devices as described herein.

It will be appreciated that the reflective layer may be structurally distinct from reflective layers formed by other means such as vapor deposition. For example, in some embodiments, the reflective layer comprises a metal or combination of metals (e.g. aluminum, silver, or aluminum and silver), at least one binder (e.g. organic or inorganic binders), and the reflective layer has a reflectivity that is at least about 30% that of the corresponding pure metal or combination of metals, for example at least about 30%, 35%, 40%, 45%, 50%, 55%, 60%, 65%, 70%, 75%, 80%, 85%, 90%, 95%, 97%, or 99%, including ranges between any two of the listed values, for example about 30%-99%, 30%-95%, 30%-90%, 30%-80%, 40%-99%, 40%-95%, 40%-90%, 40%-80%, 50%-99%, 50%-95%, 50%-90%, 50%-80%, 60%-99%, 60%-95%, 60%-90%, 60%-80%, 70%-99%, 70%-95%, 70%-90%, or 70%-80%. In some embodiments, the reflective layer is disposed on a waveguide, and is configured to redirect light propagating through the waveguide, for example as part of a light distributing element. In some embodiments, the reflective layer may be disposed on the waveguide by way of a deposition process described herein. In some embodiments, the reflective layer is disposed on a waveguide, and is configured to direct light into the waveguide, for example as part of an incoupling optical element. In some embodiments, the waveguide is part of a display device.

Figure 10A:
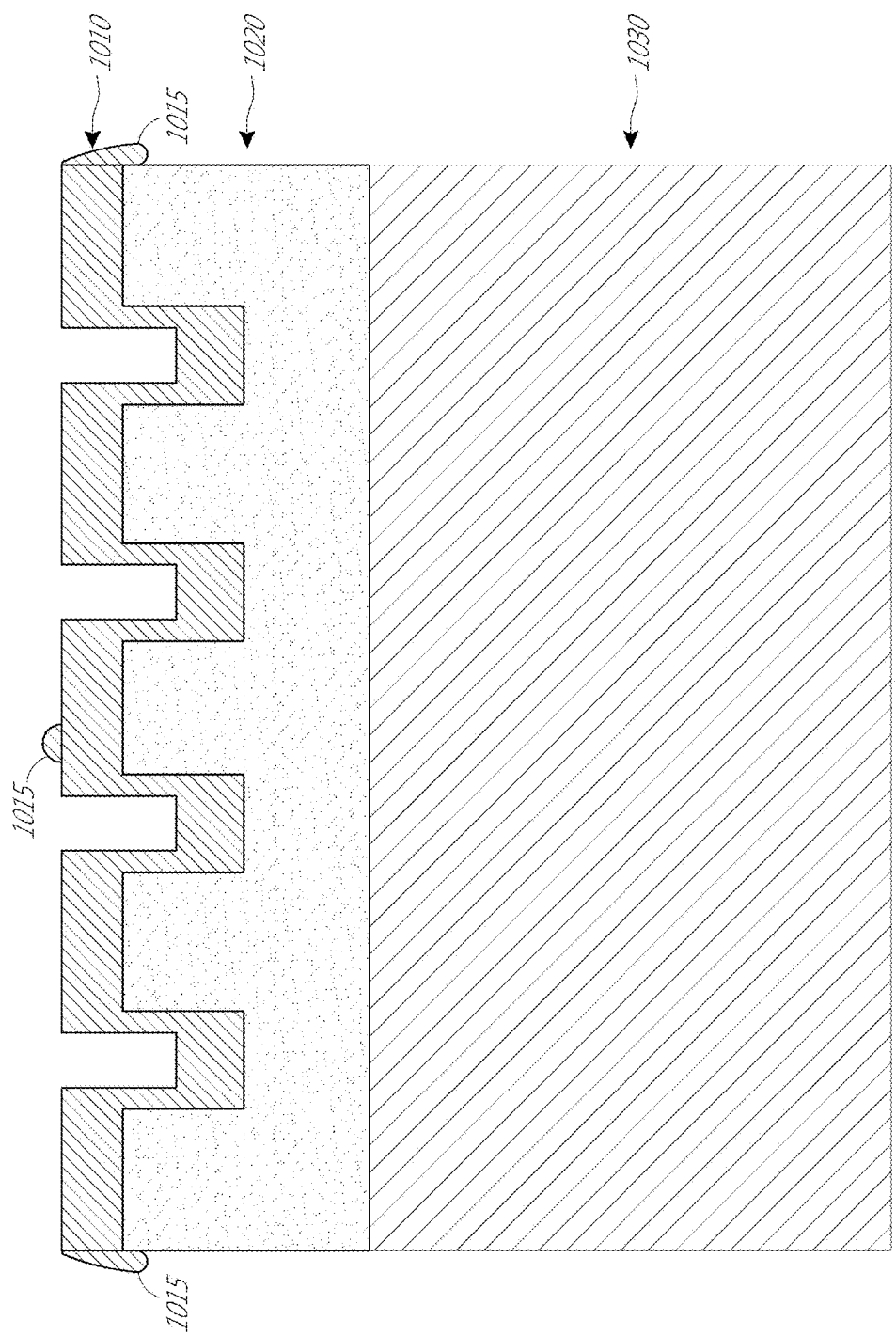
FIG. 10A shows a schematic cross-sectional side view of a reflective layer deposited on a pattern of protrusions in accordance with some embodiments.

As used herein, "surface accumulations," refer to irregular accumulations of material formed from a reflective ink (e.g., lines, "spaghetti-like" strands, or islands of ink material) that extend from a surface of a reflective layer as described herein as artifacts in the reflective layer due to the flowable and viscous nature of the reflective ink (see, e.g., 1015 in FIG. 10A). Solely for ease of conceptualization, surface accumulations may be thought of as analogous to drips of dried paint that may be present when paint is applied thickly to a wall or canvas. The accumulations may have nanometer-scale heights, lengths, and diameters in some embodiments. The accumulations are typically on a surface of the reflective layer that is not at the interface with a waveguide surface or other surface onto which the reflective layer is deposited. Thus, in some embodiments, a reflective layer formed from reflective inks as described herein may comprise surfaces accumulations, but may maintain high levels of reflectivity.

Figure 10B:
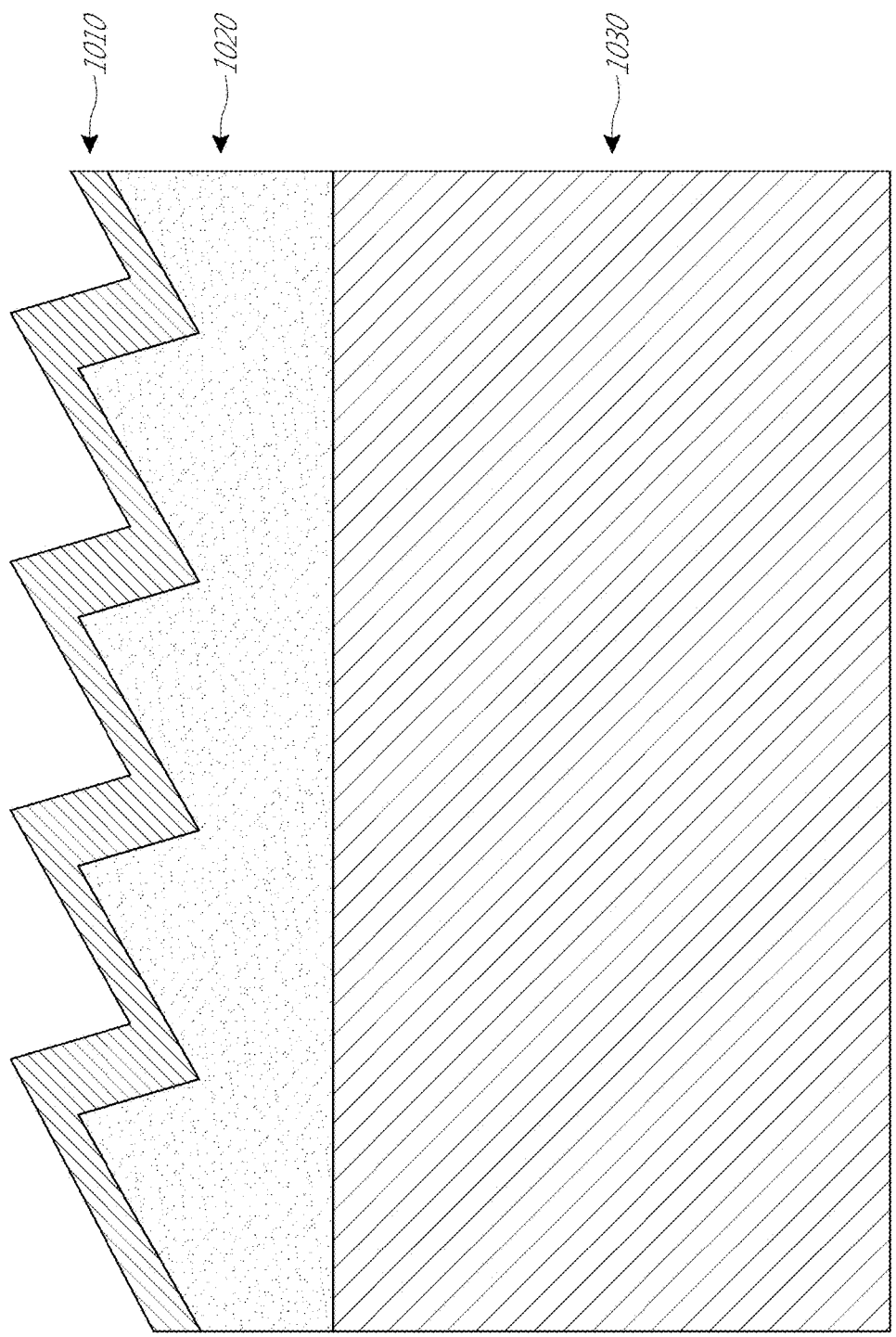
FIG. 10B shows a schematic cross-sectional side view of a reflective layer deposited on a pattern of protrusions in accordance with some other embodiments.
Figure 10C:
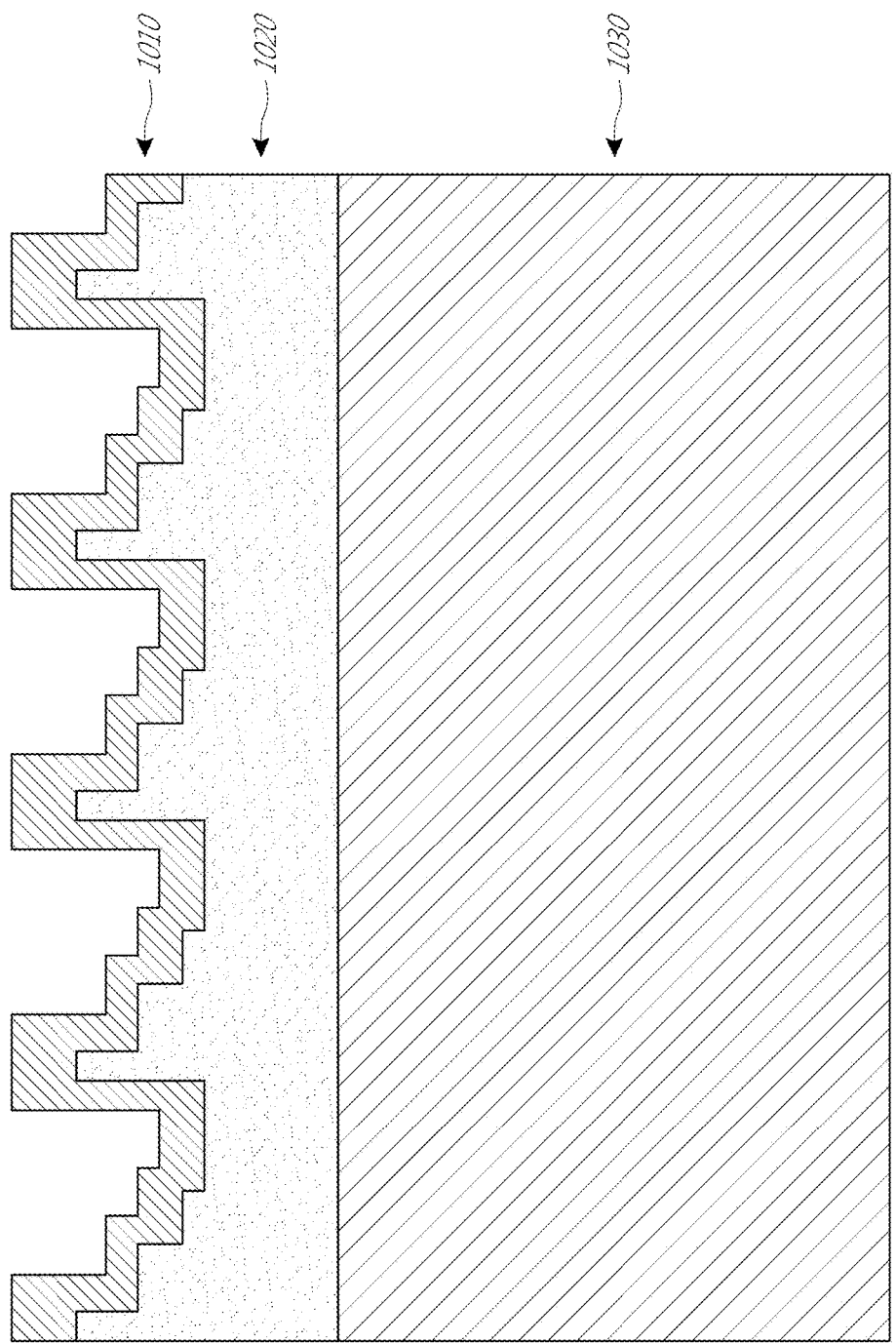
FIG. 10C shows a schematic cross-sectional side view of a reflective layer deposited on a pattern of protrusions in accordance with yet other embodiments.

As used herein, "protrusions," "surface protrusions," and variations of these root terms refer to masses of material that extend upwards on or in a substrate, such as in optical gratings extending from the surface of a waveguide. In some embodiments, the protrusions may be formed by etching a substrate, which may include deposited material (e.g., photoresist deposited on a waveguide) or may be a substantially homogenous structure (e.g., a waveguide). In some embodiments, a reflective layer 1010 comprising surface accumulations 1015 is disposed over an optical grating 1020 (see FIG. 10A). The patterned resist or grating 1020 may comprise accumulations 1015. In some embodiments, a reflective layer 1010 is disposed over an optical grating 1020 having a blazed configuration (see FIG. 10B). In some embodiments, a reflective layer 1010 is disposed over an optical grating 1020 having a multilevel configuration (see FIG. 10C). In some embodiments, the optical grating comprises photoresist.

It will be appreciated that the reflective layer is preferably utilized to provide reflections of light back into and/or through the waveguide. Consequently, the flowable material preferably coats all surfaces of the protrusions. In some embodiments, the reflective layer is disposed conformally on the optical grating. It is noted that when a material is disposed "conformally" it will substantially conform to the underlying surface.

In some embodiments, due to liquid or semi-liquid characteristics of reflective inks, the reflective layer may be slightly thinner in portions that were nearer the top of a waveguide protrusion during setting, and characteristically may be slightly thicker in portions that were nearer the bottom during setting. It is noted that these slight differences are not expected to negatively impact the performance of the reflective layer. In some embodiments, the reflective layer is deposited conformally, and the thickness of the reflective layer over the surface (e.g. a straight-line thickness extending from the surface across the layer) varies by no more than about ±20%, so that across the entire reflective layer, the thickness is within ±20% of a mean, for example within ±20%, ±15%, ±10%, ±5%, or ±1% of the mean. Preferably, the conformal reflective layer is disposed to be free or to be substantially free of gaps between the reflective layer and the surface of the substrate. It is also contemplated that non-conformal reflective layers may provide suitable reflectivity at the relevant interface in some embodiments (e.g., without being limited by theory, so long at the surface of the reflective layer at the interface with a waveguide is sufficiently reflective and provides sufficient coverage, an opposite surface that does not face the waveguide may not need to conform to the waveguide). Accordingly, in some embodiments, a reflective layer is disposed non-conformally on a substrate. Preferably, the non-conformal layer is disposed to be free or to be substantially free of gaps between the reflective layer and the surface of the substrate. By "substantially free" of gaps between the reflective layer and the substrate, it is understood that while some gaps may be present, they do not appreciably diminish the reflectivity of the reflective optical element formed by the reflective layer and substrate compared to a reflective layer that is free of gaps. In some embodiments, the ink is deposited to a sufficient thickness to completely or substantially completely fill in the open volumes or gaps between the waveguide protrusions.

In some embodiments, reflective inks comprise binders such as organic or inorganic binders, which may provide one or more of the follow: allow the reflective inks to have a sufficient viscosity to form a high-fidelity pattern, allow the reflective layers to set quickly, facilitate the adhesion of deposited layers to a surface, such as a waveguide, and permit the reflective layer to remain stably disposed over a surface and adhered to the surface. Consequently, in some embodiments, reflective layers comprising or consisting of the reflective inks as described herein comprise binders (which, after setting, may be bonded to substances in the reflective layer, and or a surface upon which the reflective layer is disposed). Relative adhesion may be measured, for example, using a scratch test, in which a deposited layer is cracked or cut in a pattern such as a cross-hash pattern, contacted with an adhesive substrate such as tape, and the adhesive substrate is then removed, and the fraction of units of the reflective layer that are removed by the adhesive substrate is determined (e.g., the fewer units of the reflective layer that are removed, the stronger the adhesion). An example scratch test is described in ATSM Standard D3359-09, "Standard Test Methods for Measuring Adhesion by Tape Test," published June 2009, which is hereby incorporated by reference in its entirety.

In some embodiments reflective inks comprise particles, such as metal-containing nanoparticles or microparticles. Without being limited by theory, it is contemplated that metal particles may partially scatter the light, and thus, the reflectivity of a particle-containing reflective layer may be lower than that of a particle-free layer. However, it is further contemplated that some reflective inks comprising particles may offer suitable reflectivity for waveguides and/or display devices as described herein. Accordingly, in some embodiments, a reflective layer comprises particles, for example metal-containing nanoparticles and/or metal-containing microparticles.

As noted above, without being limited by theory, particles present in a reflective ink and reflective layer may undesirably diffuse light. Accordingly, in some embodiments, the reflective ink is particle-free, or substantially particle free. As such, in some embodiments, the reflective layer does not comprise particles as described herein (e.g. the reflective layer contains neither metal-containing microparticles nor metal-containing nanoparticles). In some embodiments, the reflective ink is particle-free or substantially particle-free and comprises a non-metal, and as such, the reflective layer formed with the reflective ink is particle-free or substantially particle-free and comprises a non-metal. In some embodiments, the particle-free ink comprises a metal and a ligand configured to bind to the metal, so as to form a reflective layer upon setting, for example a silver-containing ink that further comprises a carbamate ligand. In some embodiments, the particle-free ink is of the formula $|Ag(NH_3)_2|^+$ $|C_2H_3O_2|^-$. In some embodiments, the reflective layer is free of, or substantially free of particles, and further comprises surface accumulations as described herein.

In some embodiments, a reflective layer of desired thickness is formed. As such, in some embodiments, the reflective layer has a thickness of least about 10 nm, for example, at least about 10 nm, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, or 1000 nm, including thickness ranges between any two of the listed values, for example, thicknesses of about 10 nm to 900 nm, 10 nm to 500 nm, 10 nm to 410 nm, 10 nm to 400 nm, 10 nm to 350 nm, 10 nm to 300 nm, 10 nm to 250 nm, 10 nm to 200 nm, 10 nm to 150, 10 nm to 100 nm, 10 nm to 50 nm, 30 nm to 900 nm, 30 nm to 500 nm, 30 nm to 450 nm, 30 nm to 400 nm, 30 nm to 350 nm, 30 nm to 300 nm, 30 nm to 250 nm, 30 nm to 200 nm, 30 nm to 150, 30 nm to 100 nm, 30 nm to 50 nm, 50 nm to 900 nm, 50 nm to 500 nm, 50 nm to 450 nm, 50 nm to 400 nm, 50 nm to 350 nm, 50 nm to 300 nm, 50 nm to 250 nm, 50 nm to 200 nm, 50 nm to 150, 50 nm to 100 nm, 80 nm to 900 nm, 80 nm to 500 nm, 80 nm to 450 nm, 80 nm to 400 nm, 80 nm to 350 nm, 80 nm to 300 nm, 80 nm to 250 nm, 80 nm to 200 nm, 80 nm to 150, 80 nm to 100 nm, 100 nm to 900 nm, 100 nm to 500 nm, 100 nm to 450 nm, 100 nm to 400 nm, 100 nm to 350 nm, 100 nm to 300 nm, 100 nm to 250 nm, 100 nm to 200 nm, or 100 nm to 150 nm. In some embodiments, a single layer of flowable material is deposited with a suitable thickness and viscosity, so as to form the reflective layer of desired thickness upon setting. In some embodiments, a layer of flowable material is applied, at least partially set, and at least one subsequent layer of flowable material is applied on top of the set or partially set layer. Cycles of applying flowable material may be repeated until a reflective layer of desired thickness is achieved. For example, at least two, three, four, five, six, seven, eight, nine, ten, eleven, twelve, thirteen, fourteen, fifteen, sixteen, seventeen, eighteen, nineteen, or twenty cycles of flowable material application may be performed (including ranges between any of the two listed values) so as to form the reflective layer of desired thickness.

In some embodiments, as an alternative to or in addition to reflective inks, liquid metals may be utilized to form the reflective layer. In some embodiments, the liquid metals may comprise: gallium; indium; mercury; gallium-indium eutectic; gallium-indium alloy; gallium indium tin alloy; Ga, In, Sn and Zn alloy; Ga, In, and Sn alloy; GALINSTAN® available from Geratherm Medical AG of Geschwenda, Germany; sodium-potassium alloy (NaK); gallium, indium and stannum; gallium-indium-zinc-copper metallic; and silver indium gallium. Preferably, sufficient amounts of liquid metal are deposited to coat exposed surfaces of underlying protrusions. For example, the liquid metal may be dispensed on the protrusions, flowing into and filling the spaces between the protrusions. In some embodiments, the liquid metal may be deposited to a height above the protrusions.

It will be appreciated that the underlying protrusions may form diffractive optical elements (e.g., a diffractive grating), which may be utilized as incoupling optical elements. As discussed herein, these protrusions may be metallized by PVD to form reflective diffractive optical elements. In some embodiments, liquid metal may be deposited on the protrusions in place of the PVD metallization. For example, liquid metal may be deposited to directly contact and coat surfaces of the protrusions, thereby forming a reflective layer. Advantageously, replacing PVD metallization with liquid metal reflective layers has been found to provide similar levels of optical performance. For example, reflective diffractive optical elements formed using the liquid metal reflective layers have been found to provide similar diffraction efficiencies as otherwise similar diffractive optical elements formed using PVD metallization. In some embodiments, the liquid metal-based diffractive optical elements have diffraction efficiencies of 2-4%, or 2-3%, for light incident on the diffractive optical elements at angles normal (perpendicular) to those diffractive optical elements. In some environments, liquid metal-based diffractive optical elements are configured to redirect the incident light such that it propagates through the substrate (e.g., a waveguide) by total internal reflection.

In some embodiments, an optical waveguide stack is provided. The optical waveguide stack may comprise a first waveguide comprising a first surface, and a reflective layer disposed conformally on protrusions of the first surface and adhered to the first surface as described herein. The reflective layer may comprise an interface with the first surface, configured to reflect incident electromagnetic radiation (e.g., light of the visible spectrum) at the interface into the first waveguide as described herein. The optical waveguide stack may comprise at least one other optical waveguide as described herein. In some embodiments, the protrusions of the surface of the first waveguide onto which the reflective layer is disposed form an optical grating, for example a binary grating, a blazed grating, a multilevel grating, an undercut grating, or a metamaterial or metasurface grating, as described herein. In some embodiments, the optical grating comprises patterned photoresist.

In some embodiments, the reflective layer may be localized in certain regions of the surface of a waveguide using one or more walls. The one or more walls may extend vertically to a height above surface protrusions on the substrate. Viewed another way, the one or more walls may extend vertically from the bottom of a recess to the surface, or above. In some embodiments, the reflective layer may partially or completely fill the volume surrounded by the walls. Advantageously, these walls and the reflective layer function as a spacer to provide a gap between the waveguides of the stack of waveguides. In some embodiments, the gap is an air gap, which facilitates total internal reflection within the waveguides by providing a low refractive index interface with the waveguides.

In some embodiments, the protrusions and reflective layer disposed on the first optical waveguide are part of an incoupling optical element or a light distributing element configured to reflect electromagnetic radiation (e.g., light of the visible spectrum) into the first waveguide or to redirect light propagating within the waveguide, respectively, as described herein. The incoupling optical element may facilitate propagation of electromagnetic radiation (e.g., light of the visible spectrum) within the waveguide by total internal reflection by redirecting incident ambient light such that it propagates through the waveguide at angles suitable for total internal reflection. In some embodiments, the reflective layer comprises an incoupling optical element on a first optical waveguide. The first optical waveguide may be part of an optical waveguide stack that further comprises a second optical waveguide. The second optical waveguide may be configured to allow electromagnetic radiation (e.g., light of the visible spectrum) to pass through it to the incoupling optical elements of the first optical waveguide. The incoupling optical elements of the first optical waveguide then redirect the electromagnetic radiation into the first optical waveguide.

In some embodiments, the optical waveguide stack comprises at least one additional waveguide, for example, at least 1, 2, 3, 4, 5, 6, 7, 8, 9, or 10 additional waveguides, including ranges between any two of the listed values. In some embodiments, the optical waveguide stack further comprises a third waveguide. The third waveguide may comprise outcoupling optical elements configured to output a different range of wavelengths than the first and/or second optical waveguide. In some embodiments, the first waveguide is in optical communication with at least one of the second and third optical waveguides.

In some embodiments, a display device as described herein comprises the optical waveguide stack. In some embodiments, a spatial light modulator may be optically coupled to the waveguide stack and configured to inject light into the waveguide stack. The light may be encoded with image information and may be directed through the waveguide stack to be outputted to the eyes of a user, as described herein.

It will be appreciated that the reflective layer formed of flowable material may unintentionally reflect light out of a waveguide. As discussed herein, a reflective layer deposited on the surfaces of a pattern of protrusions may form a reflective diffractive grating on the waveguide. The diffractive grating may redirect incident light at angles such that it propagates through the waveguide by total internal reflection. In one example, light incident on the diffractive grating will be incoupled to the waveguide such that it propagates away from the diffractive grating at angles suitable for TIR within the waveguide. It will be appreciated that light that is incoupled may propagate through the waveguide by TIR, reflecting off surfaces of the waveguide at angles similar to the angle at incoupling. Depending on the geometry of the diffractive grating, or the beam diameter of the light, some of this light may be incident on the diffractive grating during an early reflection of the TIR path, and will undesirably be redirected out of the waveguide. For example, the diffractive grating may be on one surface of the waveguide and incident light may be redirected such that it is incoupled and reflects off an opposite surface of the waveguide. The reflected light may then be incident on the diffractive grating, which causes the light to be redirected out of the waveguide. In some embodiments, to prevent the undesirable redirection of light out of the waveguide, the diffractive grating on which the reflective layer is deposited may be sized and shaped, or the beam diameter may be adjusted, such that incoupled light that is reflected off an opposite surface of the waveguide does not strike the diffractive grating.

Devices Comprising Reflective Layers

In some embodiments, a reflective layer as described herein is disposed in a display device. In some embodiments, the reflective layer is disposed on a waveguide. The reflective layer may be part of, for example, an "incoupling optical element" as described herein, and/or a "light distributing element" as described herein, each of which is a kind of "reflective optical element" (e.g., light distributing elements 1214, 1224, 1234 of FIG. 9A), and may be disposed on a waveguide. In some embodiments, a first reflective layer is part of an "incoupling optical element," and a second reflective layer comprises 'light distributing element," and the first and second reflective layer are disposed on the same waveguide at, e.g., a similar vertical level. In some embodiments, a first portion of a reflective layer is part of an "incoupling optical element," and a second portion of the same reflective layer is part of a "light distributing element," and the first and second portions of the reflective layer are disposed on the same waveguide. The waveguide may be part of a display device such as a wearable display system as described herein. In some embodiments, the reflective layer may be disposed on a waveguide so as to redirect the internal propagation of light in the waveguide, for example as a light distributing element. In some embodiments, the reflective layer is part of a light distributing element that is a "pupil expander," which may increase the size of a relatively focused point of light before directing the light to the retina of a wearer of a wearable display system.

In some embodiments, the reflective layer is disposed conformally on an underlying surface, for example a waveguide. As discussed herein, the surface may comprise protrusions, e.g., features such as gratings (for example binary, blazed, metamaterial or metasurfaces, undercut, and/or multilevel gratings), which may be formed of patterned materials such as patterned resists. As such, in some embodiments, the reflective layer 1010 is deposited conformally on a non-planar feature such as a grating 1020, which, for example may comprise a binary (see, FIG. 10A) blazed (see FIG. 10B), or multilevel (see FIG. 10C) configuration. The feature 1020 can be disposed on a substrate 1030. Such features on the surface may be nanometer or micrometer scale. For example nanometer scale features may have heights, depths, and/or diameters in the nanometer-scale range, for example heights, depths, and/or diameters in the range of tens or hundreds of nanometers, for example about 20 nm to about 500 nm. In some embodiments, the reflective layer 1005 comprises surface accumulations 1015.

In some embodiments, the reflective layer is adhered to an underlying substrate surface, for example a waveguide. In some embodiments, the reflective layer comprises a binder, and the binder interacts with the underlying surface so as to contribute to the adherence of the reflective layer to the underlying surface.

Reference will now be made to the drawings, in which like reference numerals refer to like features throughout.

Figure 2:
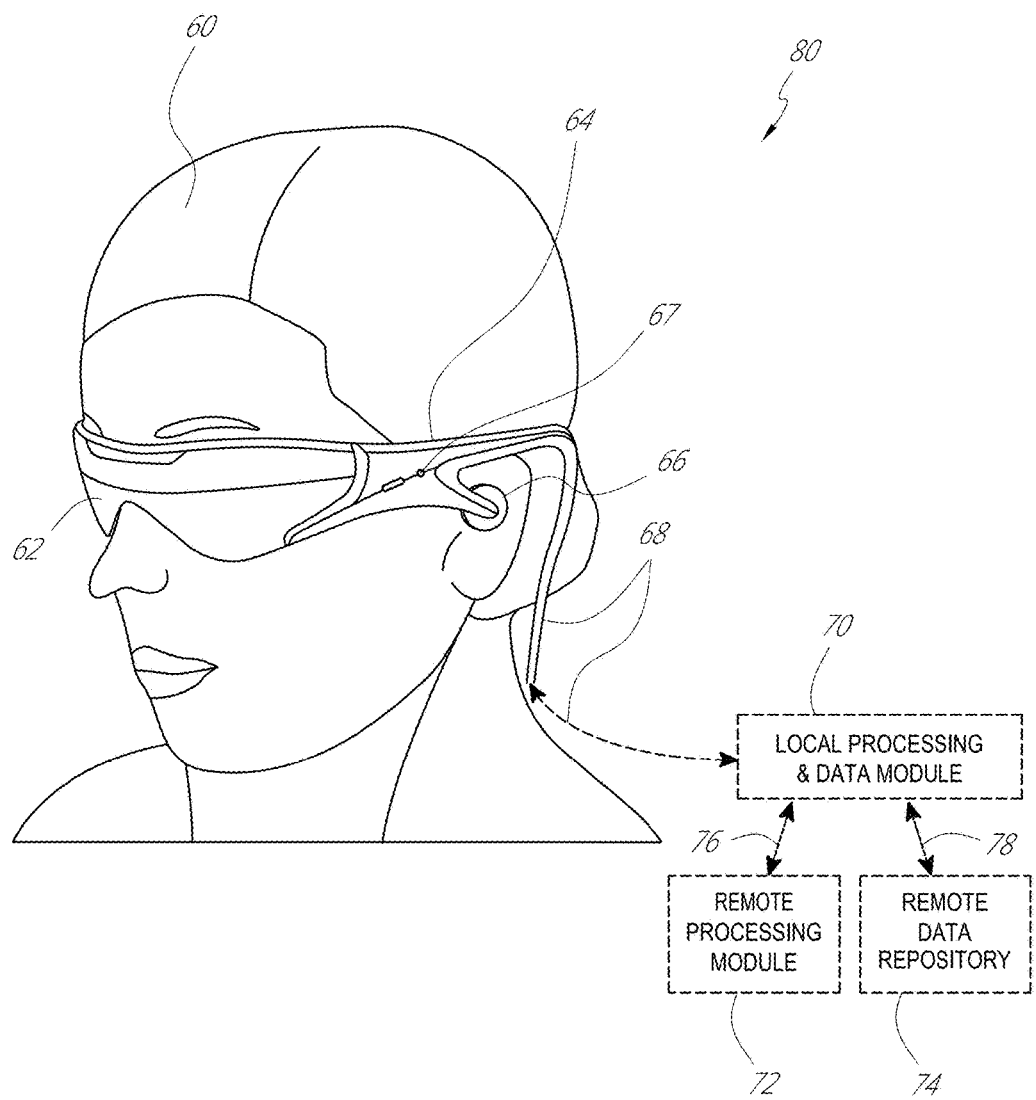
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (another speaker, not shown, may optionally be positioned adjacent the other ear canal of the user to provide for stereo/shapeable sound control). The display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems).

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
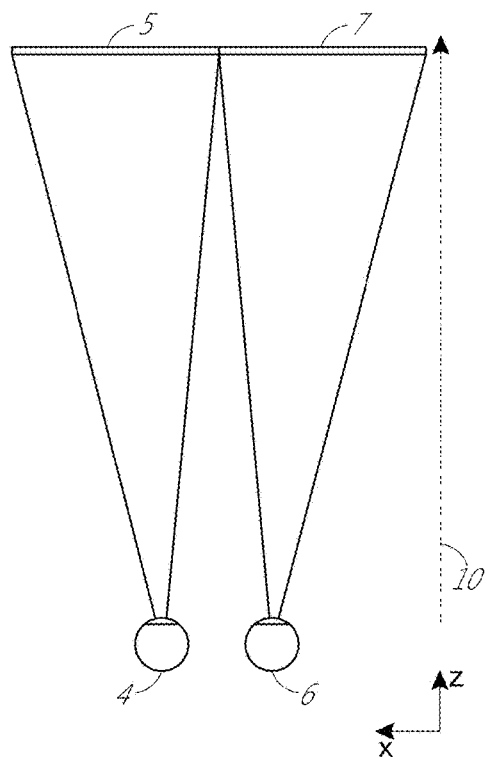
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
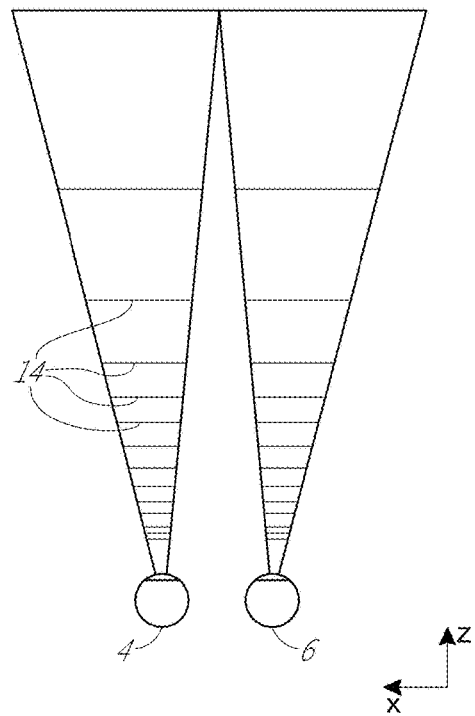
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
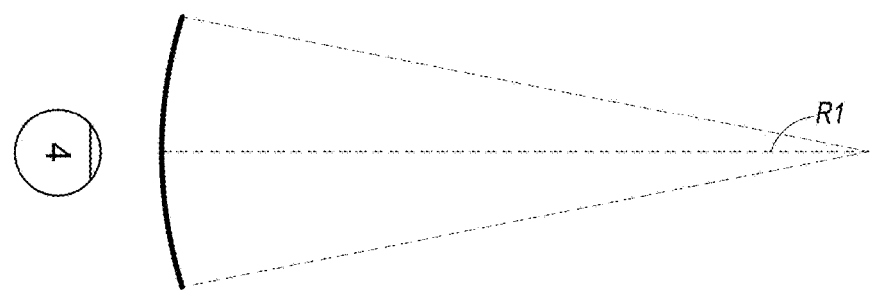
FIGS. 5A-5C illustrate relationships between radius of curvature and focal radius.
Figure 5B:
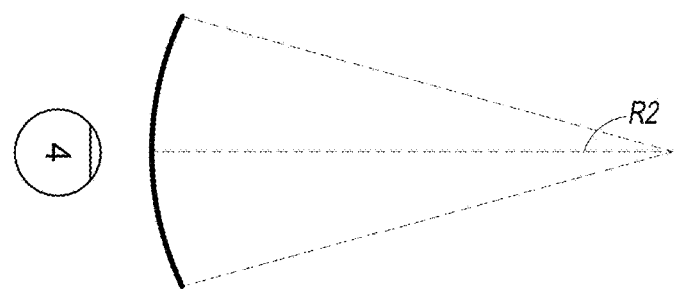
Figure 5C:
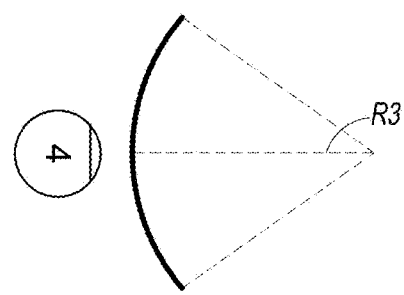

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be the that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
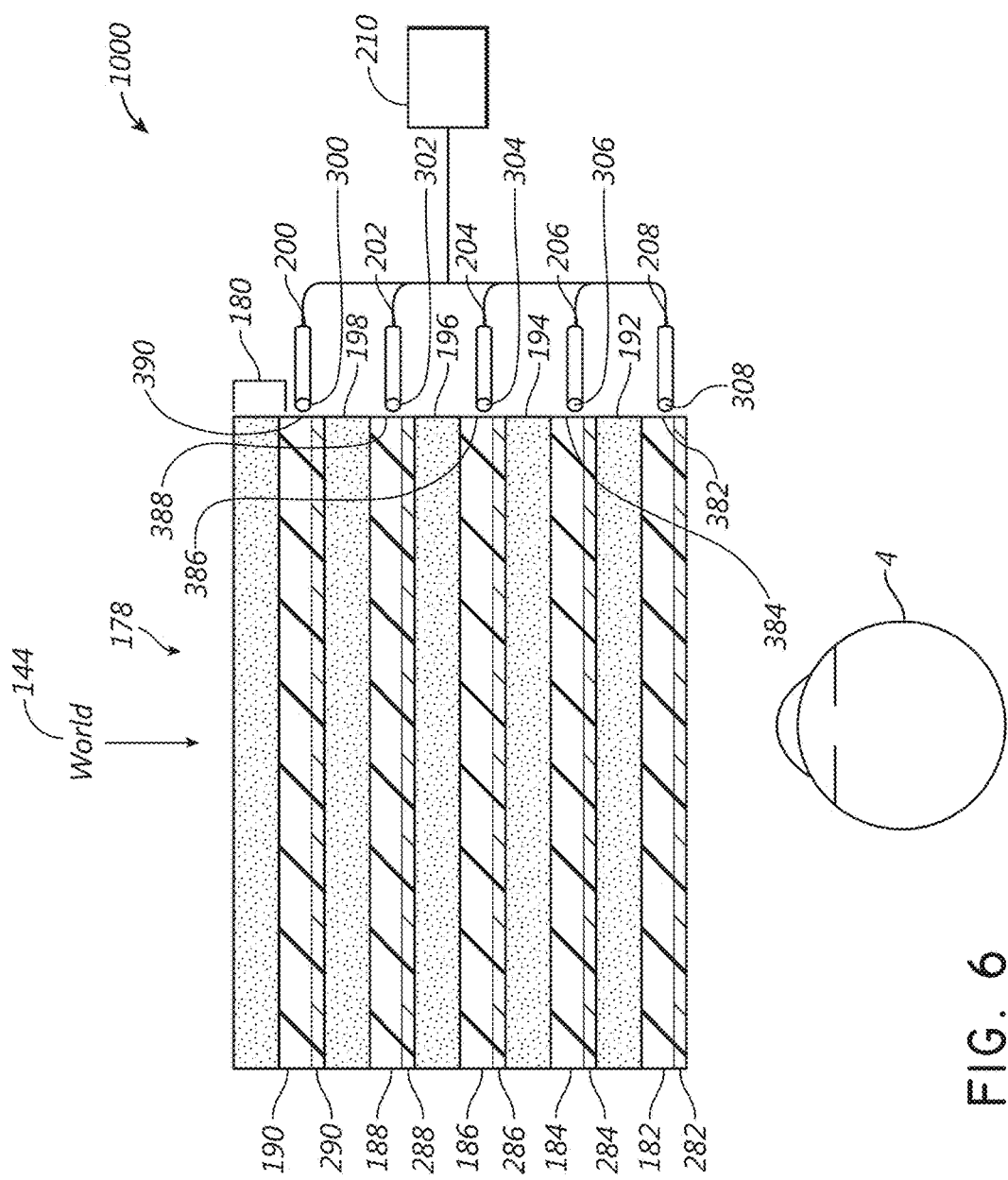
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2. It will be appreciated that the display system 1000 may be considered a light field display in some embodiments.

With continued reference to FIG. 6, the waveguide assembly 178 may also include a plurality of features 198, 196, 194, 192 between the waveguides. In some embodiments, the features 198, 196, 194, 192 may be one or more lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the each of the input surfaces 382, 384, 386, 388, 390 may be an edge of a corresponding waveguide, or may be part of a major surface of the corresponding waveguide (that is, one or both of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 182, 184, 186, 188, 190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 182, 184, 186, 188, 190 and ultimately to the eye 4 of the viewer. In some embodiments, the illustrated image injection devices 200, 202, 204, 206, 208 may schematically represent a single scanning fiber or a bundles of scanning fibers configured to inject light into one or a plurality of the waveguides 182, 184, 186, 188, 190. In some other embodiments, the illustrated image injection devices 200, 202, 204, 206, 208 may schematically represent a plurality of scanning fibers or a plurality of bundles of scanning, fibers each of which are configured to inject light into an associated one of the waveguides 182, 184, 186, 188, 190. It will be appreciated that the one or more optical fibers may be configured to transmit light from the light module 2040 to the one or more waveguides 182, 184, 186, 188, 190. It will be appreciated that one or more intervening optical structures may be provided between the scanning fiber, or fibers, and the one or more waveguides 182, 184, 186, 188, 190 to, e.g., redirect light exiting the scanning fiber into the one or more waveguides 182, 184, 186, 188, 190.

A controller 210 controls the operation of one or more of the stacked waveguide assembly 178, including operation of the image injection devices 200, 202, 204, 206, 208, the light source 2040, and the light modulator 2030. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it reaches the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186,

188, 190 may be configured to output images set to the same depth plane, or multiple subsets of the waveguides 182, 184, 186, 188, 190 may be configured to output images set to the same plurality of depth planes, with one set for each depth plane. This may provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500. In some embodiments, one camera assembly 500 may be utilized for each eye, to separately monitor each eye.

Figure 7:
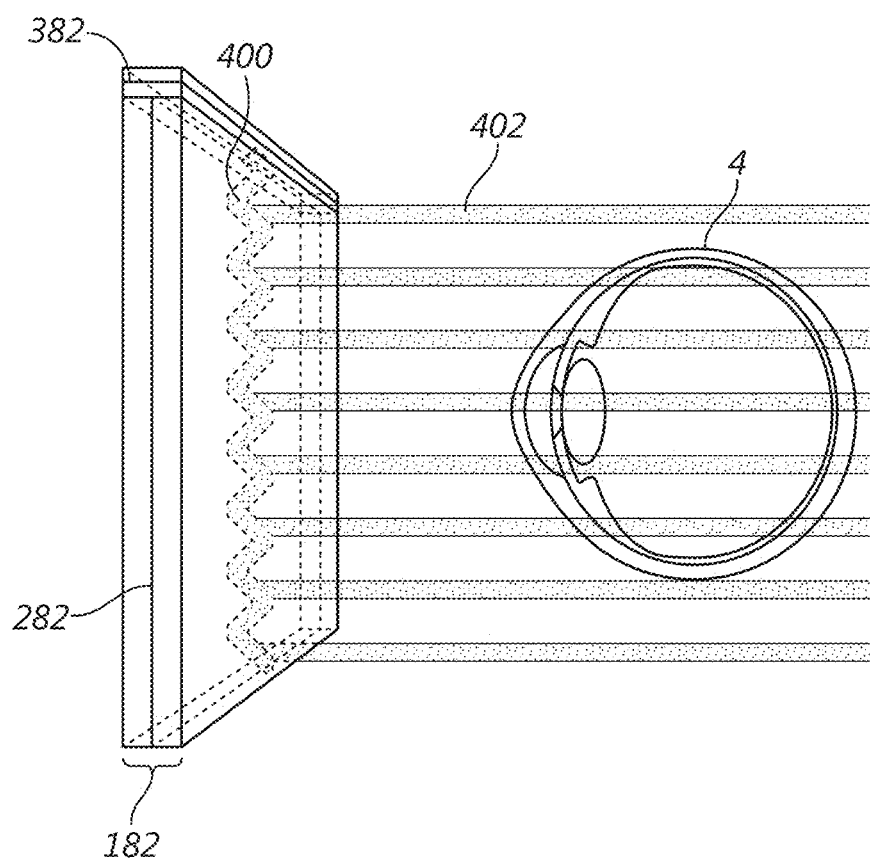
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 178 (FIG. 6) may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
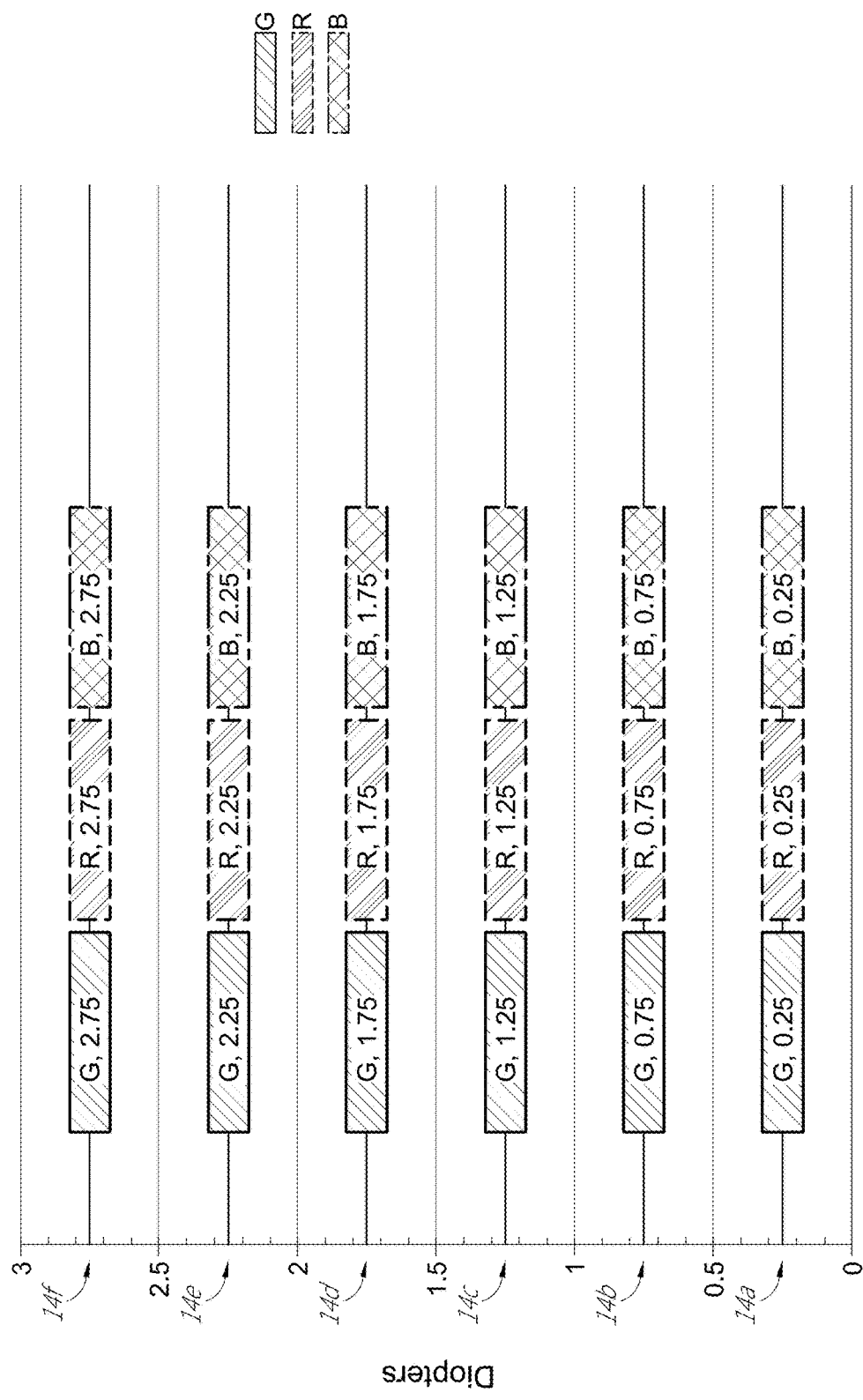
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

Figure 9A:
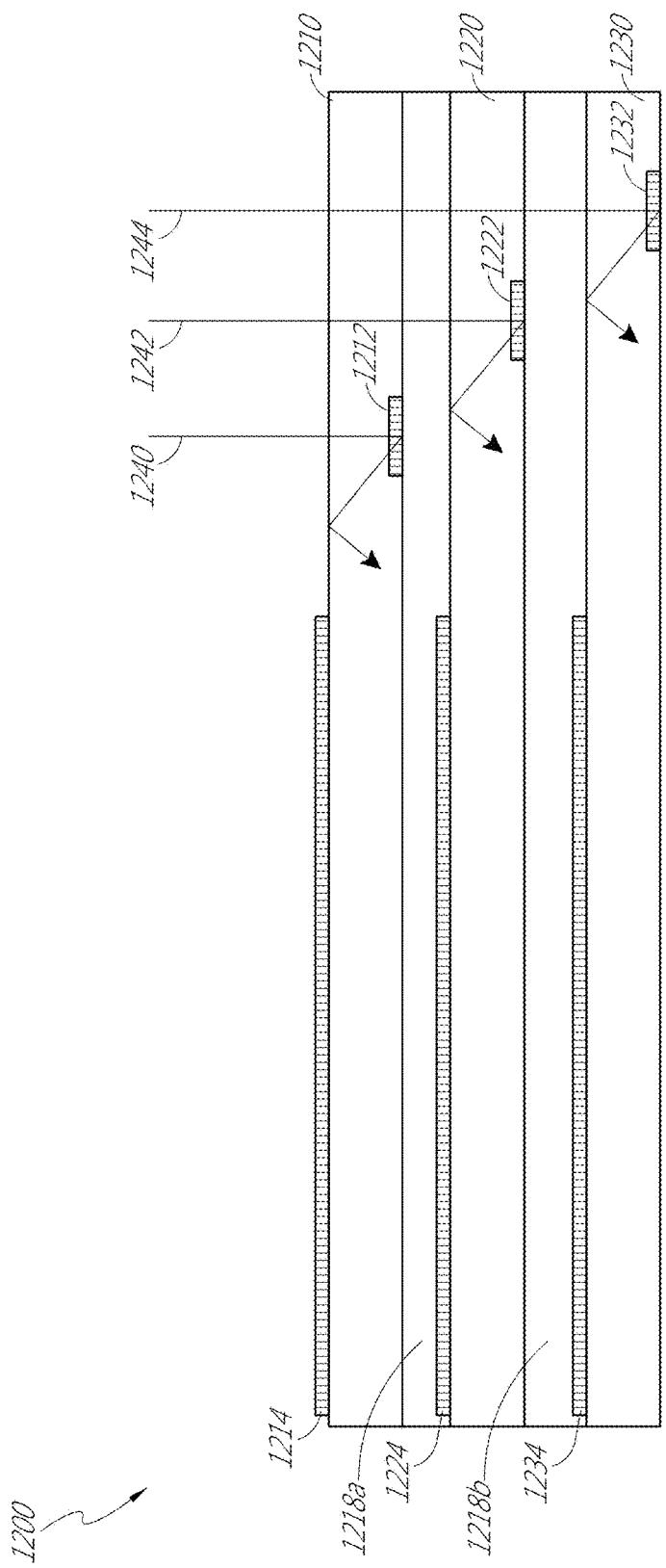
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. In some embodiments, an incoupling element comprises a reflective layer as described herein. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1213, 1223, 1233 and may be separated (e.g., laterally spaced apart) from other incoupling optical elements 1212, 1222, 1232 such that it substantially does not receive light from the other ones of the incoupling optical elements 1212, 1222, 1232. As such, a reflective layer may comprise portions that are laterally offset, and/or a waveguide may comprise two or more laterally offset reflective layers.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some embodiments, a light distributing element comprises a reflective layer as described herein. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 1222, 1232 each deflect the incident light such that the light propagates through a respective one of the waveguides 1210, 1220, 1230 by TIR. In some embodiments, the incoupling optical elements 1212, 122, 1232 each selectively deflect one or more particular wavelengths of light, while transmitting other wavelengths to an underlying waveguide and associated incoupling optical element. In some embodiments, the incoupling optical elements 1212, 1222, 1232 each comprise a reflective layer as described herein. The reflective layers may be configured propagates light rays through the respective waveguide 1210, 1220, 1230 by TIR. As such, in some embodiments, the incoupling optical element 1212, 1222, 1232 comprises a reflective layer having a reflective surface at an interface with the corresponding waveguide, so as to propagate light in the waveguide by TIR.

For example, incoupling optical element 1212 may be configured to deflect ray 1240, which has a first wavelength or range of wavelengths, while transmitting rays 1242 and 1244, which have different second and third wavelengths or ranges of wavelengths, respectively. The transmitted ray 1242 then impinges on and is deflected by the incoupling optical element 1222, which is configured to selectively deflect light of second wavelength or range of wavelengths. The ray 1244 is transmitted by the incoupling optical element 1222 and continues on to impinge on and be deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234. In some embodiments, the light distributing elements 1214, 1224, 1234 each comprise a reflective layer as described herein. The reflective layers may be configured to propagate light rays through the respective waveguide 1210, 1220, 1230 by TIR. As such, in some embodiments, the light distributing element 1214, 1224, 1234 comprises a reflective layer having a reflective surface at an interface with the corresponding waveguide, so as to redirect light propagating by TIR through the waveguide. In some embodiments, the incoupling optical element 1212, 1222, 1232 for a given waveguide 1210, 1220, 1230 comprises a reflective layer, and a different portion of the same reflective layer comprises a light distributing element 1214, 1224, 1234 for the waveguide 1210, 1220, 1230. In some embodiments, the incoupling optical element 1212, 1222, 1232 for a given waveguide 1210, 1220, 1230 comprises a first reflective layer, and a light distributing element 1214, 1224, 1234 for the waveguide 1210, 1220, 1230 comprises a second reflective layer different from the first reflective layer.

Figure 9B:
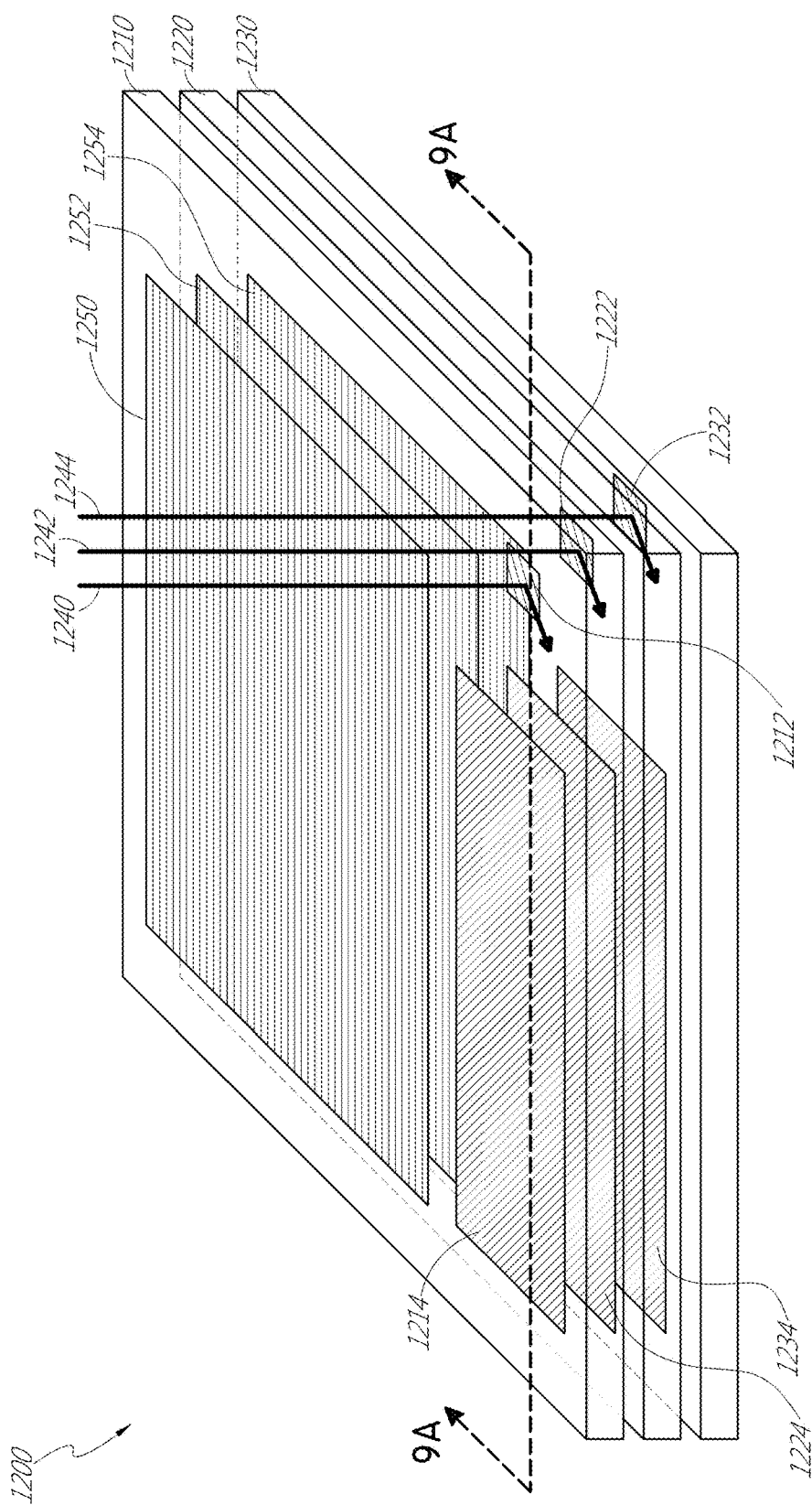
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively. In some embodiments, the incoupling optical elements 1212, 1222, 1232 comprise a reflective layer as described herein. In some embodiments, the light distributing elements 1214, 1224, 1234 comprise a reflective layer as described herein. In some embodiments, the incoupling optical elements 1212, 1222, 1232 for a given waveguide 1210, 1220, 1230 and the light distributing elements 1214, 1224, 1234 for the same waveguide comprise different portions of the same reflective layer. In some embodiments, the incoupling optical elements 1212, 1222, 1232 for a given waveguide 1210, 1220, 1230 comprises a first reflective layer and the light distributing elements 1214, 1224, 1234 for the same waveguide comprises a second reflective layer that is different from the first reflective layer.

In some embodiments, the light distributing elements 1214, 1224, 1234 are orthogonal pupil expanders (OPE's). As such, in some embodiments, the reflective layer is part of an OPE. In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
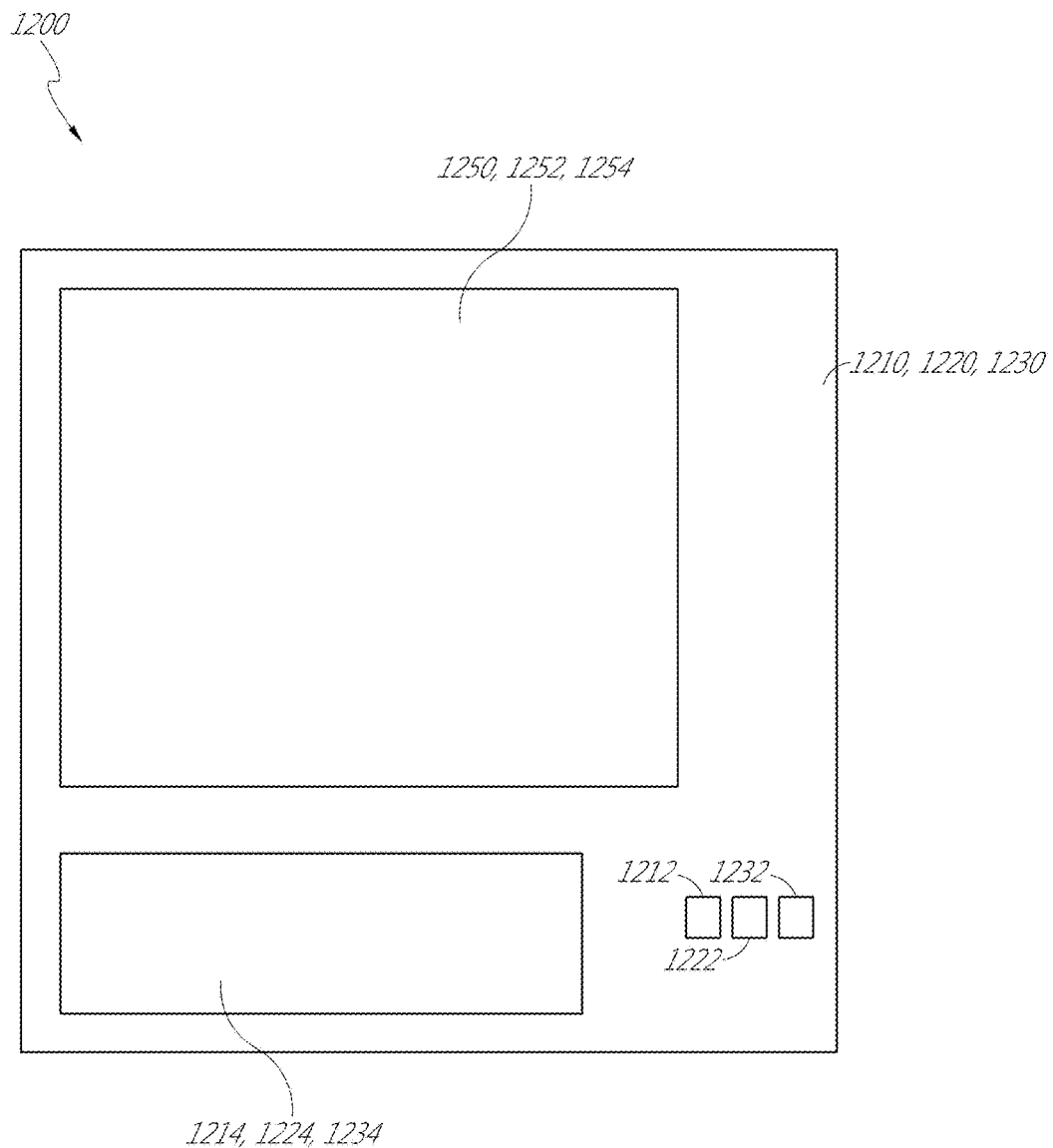
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Optical Waveguides and Methods of Making the Same

In some embodiments, methods of making optical waveguides are described. The method may comprise directly administering a reflective flowable material as described herein onto a substrate such as a substrate, for example a waveguide. The reflective flowable material may be administered in a predetermined region of the substrate. The reflective flowable material, e.g., a reflective ink, may set, forming a reflective layer. In some embodiments, when the reflective layer of reflective flowable material is formed on the predetermined region of the substrate, it forms a desired pattern. In some embodiments, the reflective layer of reflective flowable material covers all or substantially all of a surface of the substrate. In some embodiments, the method further comprises die cutting or dicing the substrate and reflective layer into many different pieces, so as to form a plurality of reflective optical elements. In some embodiments, the optical waveguide comprising a reflective layer is part of an optical waveguide stack, and the method further comprises attaching one or more other optical waveguides to the optical waveguide so as to form the stack. In some embodiments, the optical waveguide comprising a reflective layer is part of a display device, and as such, the method further comprises disposing the waveguide comprising the reflective layer (or the stack comprising such a waveguide) in a display device. In some embodiments, the surface of one or more optical waveguides of the stack comprises walls, which define a region onto which a reflective layer of reflective flowable material is deposited. The walls may be of graded heights, so that inner walls, which define an area for depositing reflective flowable material are lower than outer walls surrounding the inner walls. Without being limited by theory, it is contemplated that the progression of wall heights can help to prevent defects when filling the region defined by the inner wall by, e.g., consistently confining the location of the deposited reflective flowable material. As such, in some embodiments, the walls serve as dams or molds so as to contain reflective flowable material in a predetermined region of the substrate. In some embodiments, the walls may further serve as spacers to separate waveguides of the stack from each other. In some embodiments, the walls comprise resist. It is contemplated that resist walls can be deposited as a layer that extends across the substrate and then patterned to define the walls in accordance with some embodiments.

In some embodiments, the method of making an optical waveguide comprises contacting a first surface of a first waveguide with a reflective flowable material as described herein. The method may further comprise permitting the reflective flowable material (e.g., a reflective ink) to set, so as to form a reflective layer on the first surface of the first waveguide. The reflective layer may be configured to reflect incident electromagnetic radiation such as light in the visible spectrum. For example, the electromagnetic radiation may be reflected into the first waveguide at an angle dependent upon the pattern and dimensions of protrusions underlying the reflective layer. Thus, a reflective layer disposed on a waveguide may be formed, and this formation may be part of making a display device.

A number of suitable reflective flowable materials may be used to form the reflective layer, including reflective inks and liquid metals as described herein, and combinations thereof. In some embodiments, the reflective ink comprises silver, aluminum, or a combination of silver and aluminum, and optionally a binder, as disclosed herein. In some environments, the flowable material is a liquid metal, examples of which are discussed above.

There are a number of nonlimiting examples of suitable methods for depositing the reflective flowable material on the substrate surface. In some embodiments, the reflective flowable material is applied using an inkjet printer. A number of commercially-available inkjet printers are suitable, for example a NSCRYPT MICRODISPENSER inkjet printer. In some embodiments, the inkjet printer comprises a movable head that may be used for automated dispensing of the reflective flowable material (e.g., reflective ink), or the substrate may be moved relative to an immovable head. The reflective flowable material may be applied at ambient pressure and temperature. In some embodiments, the reflective flowable material is applied at a pressure of about 1 atm and a temperature of about 15-27° C., or about 18-24° C., including 21° C. In some embodiments, the inkjet printer deposits the reflective flow able material over a predetermined portion of a surface of a substrate. In some embodiments, the inkjet printer deposits the reflective flowable material over the entirety of a surface of a substrate.

In some embodiments, the reflective flowable material is deposited using a microdispenser. In some embodiments, the microdispenser comprises microdrop technology (see "Microdrop—Materials by Inkjet Technology" accessible on the world wide web at www.microdrop.com/microdrop.html). In the microdrop technology, a dispensing head may comprise a glass capillary surrounded by a piezo actuator, and comprising an opening at one end. The piezo actuator may be configured to contract, propagating a pressure wave to the glass capillary, and causing a drop of liquid to break off and form a droplet which drops through the air. In this way, the size and formation rate of small droplets, for example picoliter-scale droplets may be precisely controlled. The size of the drops may depend on the size of the opening on the end of the glass capillary. For example, the opening may have a micrometer-scale diameter, for example about 30 to 100 micrometers, which may produce drop volumes of 25 to 500 picoliters, corresponding to drop diameter of 35 to 100 micrometers. The reflective flowable material may be applied at ambient pressure and temperature. In some embodiments, the reflective flowable material is applied at a pressure of about 1 atm and a temperature of about 15-27° C., or about 18-24° C., including 21° C. In some embodiments, the microdispenser deposits the reflective flowable material over a predetermined portion of a surface of a substrate. In some embodiments, the microdispenser deposits the reflective flowable material over the entirety of a surface of a substrate.

In some embodiments, the reflective flowable material is applied using an applicator rod. The reflective flowable material may be applied at ambient pressure and temperature (e.g., one hemisphere and room temperature). In some embodiments, the reflective flowable material is applied at a pressure of about 1 atm and a temperature of about 15-27° C., or about 18-24° C., including 21° C. In some embodiments, the applicator rod is used to deposit the reflective flowable material over a predetermined portion of a surface of a substrate. In some embodiments, the applicator rod is used to deposit the reflective flowable material over the entirety of a surface of a substrate.

Preferably, as discussed herein, the flowable material is flowable under standard conditions. In some embodiments, the flowable material may be heated to change the material into a flowable or more flowable state. For example, the various dispensers and applicators disclosed herein may include a heating element configured to heat a material such that it becomes a flowable or more flowable reflective ink and/or liquid metal. For example, the heating may change the material from a solid and/or highly viscous state to a liquid and/or less viscous state.

In some embodiments, the reflective flowable material is applied to a thickness of least about 10 nm, for example, at least about 10 nm, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, or about 1000 nm, including thickness ranges between any two of the listed values, for example, thicknesses of about 10 nm to 900 nm, 10 nm to 500 nm, 10 nm to 410 nm, 10 nm to 400 nm, 10 nm to 350 nm, 10 nm to 300 nm, 10 nm to 250 nm, 10 nm to 200 nm, 10 nm to 150, 10 nm to 100 nm, 10 nm to 50 nm, 30 nm to 900 nm, 30 nm to 500 nm, 30 nm to 450 nm, 30 nm to 400 nm, 30 nm to 350 nm, 30 nm to 300 nm, 30 nm to 250 nm, 30 nm to 200 nm, 30 nm to 150, 30 nm to 100 nm, 30 nm to 50 nm, 50 nm to 900 nm, 50 nm to 500 nm, 50 nm to 450 nm, 50 nm to 400 nm, 50 nm to 350 nm, 50 nm to 300 nm, 50 nm to 250 nm, 50 nm to 200 nm, 50 nm to 150, 50 nm to 100 nm, 80 nm to 900 nm, 80 nm to 500 nm, 80 nm to 450 nm, 80 nm to 400 nm, 80 nm to 350 nm, 80 nm to 300 nm, 80 nm to 250 nm, 80 nm to 200 nm, 80 nm to 150, 80 nm to 100 nm, 100 nm to 900 nm, 100 nm to 500 nm, 100 nm to 450 nm, 100 nm to 400 nm, 100 nm to 350 nm, 100 nm to 300 nm, 100 nm to 250 nm, 100 nm to 200 nm, or about 100 nm to 150 nm.

In some embodiments, the thickness of the reflective layer formed by the flowable material may be varied. For example, the reflective layer may have a thickness of that varies by 25% or more, 50% or more, or 100% or more between different portions of that layer (e.g., the layer may have one portion that is 10 nm thick and another portion that is 20 nm thick). This variable thickness may be achieved by, e.g., depositing different amounts of material for different portions of the reflective layer. For example, flowable material may be deposited uniformly over an area, that material may be stabilized by the various processes disclosed herein (drying, annealing, etc.), additional material may be deposited on selected portions of this area to augment the thicknesses of those areas, and that additional material may then also be stabilized. Preferably, the flowable material for at least the augmentation material is sufficiently viscous and/or has sufficiently low wetting that it preserves the desired thickness differences by staying in place, e.g., by limiting lateral spread across the area of the earlier deposited flowable material. In some embodiments, different flowable materials maybe used to build up desired portions of the reflective layer to the desired thicknesses.

In some embodiments, the flowable material may cover only a portion of an underlying diffractive grating. For example, the flowable material may be deposited only on a portion of the diffractive grating and may have sufficient viscosity and/or low wetting to prevent flow to other portions of the diffractive grating, as discussed herein. As another example, as discussed herein, the surface of the substrate may include walls or barriers that limit the spread of the flowable material. In some embodiments, the walls or barriers may delineate an area that covers only a portion of the diffractive grating, such that deposited flowable material extends only over the portion of the diffractive grating encompassed by the walls or barriers.

In some embodiments, the walls are barriers may be permanent parts of a final waveguide structure. In some embodiments, the walls or barriers may be removable mask structures, which may be removed after the flowable material is set or stabilized (e.g., by exposure to atmospheric gases, by drying, and/or by annealing). For example, a photoresist layer may be deposited on the substrate and over a diffractive grating. The photoresist layer may then be patterned (e.g., by exposure to light propagating through a reticle), leaving openings where a reflective layer formed of flowable material is desired. The reflective layer is then set and the photoresist mask may be removed (e.g., using an etch selective for the photoresist mask relative to the flowable material and exposed substrate features).

Advantageously, selectively providing a reflective layer over a diffractive grating and/or providing different thicknesses for that reflective layer may allow the diffraction efficiency of the reflective diffractive grating formed with the reflective layer to be tuned. For example, the portions of the diffractive grating having a reflective layer may have a different effective diffraction efficiency than portions that do not have such a reflective layer. Similarly, a thicker portion of a reflective layer may have greater reflectivity and may provide different diffraction efficiencies than a portion of the diffractive grating having and thinner portion of the reflective layer.

Suitable conditions for allowing the flowable material to set may be readily ascertained based on the characteristics of the flowable material used, the particular application, the type of device being made (including thermal budget considerations), and the thickness of the layer. For example, the flowable material may simply be allowed to set over time by reaction to environmental conditions. In some embodiments, a liquid metal may be allowed to simply react with oxygen in the ambient atmosphere to solidify (e.g. by forming an oxide, such that the set liquid metal comprises an oxide of a component of the liquid metal, which may be a surface oxide). In some embodiments, a set liquid metal may comprise an oxide layer on its outer surface.

In some embodiments, for example for reflective inks free or substantially free of metal-containing particles, the reflective ink may simply be allowed to dry (e.g., to remove solvent), and no anneal is required. For example, the flowable material may be allowed to set for at least about 0.5 minutes, for example, at least about 0.5 minutes, 1, 2, 3, 4, 5, 6, 7, 8, 9, 10, 11, 12, 13, 14, 15, 16, 17, 18, 19, 20, 30, 40, 50, 60, 70, 80, 90, 100, 110, 120, 150, or about 180 minutes, including ranges between any of the listed values. In some embodiments, the setting is at ambient temperature and the reflective ink is allowed to set without annealing.

In some embodiments, the flowable material may be annealed. For example for reflective inks that comprise metal-containing particles, the reflective ink maybe allowed to dry, and then annealed. The annealing temperature may depend on the characteristics of the flowable material, and may be at a temperature that is at least about 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 450° C., 500° C., 550° C., 600° C., or about 650° C., including ranges between any two of the listed values, for example about 150° C.-650° C., 150° C.-500° C., 150° C.-400° C., 150° C.-300° C., 150° C.-250° C., 150° C.-200° C., 200° C.-650° C., 200° C.-500° C., 200° C.-400° C., 200° C.-300° C., 200° C.-250° C., 250° C.-650° C., 250° C.-500° C., 250° C.-400° C., 250° C.-300° C., 300° C.-650° C., 300° C.-500° C., or about 300° C.-400° C.

In some embodiments, the method comprises applying the reflective flowable material within a confined area on the first surface of the first waveguide, so as to localize the reflective layer. For example, the first surface of the first waveguide may comprise a wall (which may define a dam or mold), which may be filled with reflective flowable material so as to obtain a reflective layer over a predetermined portion of the first surface of the first waveguide. In some embodiments, the wall comprises a dummy or sacrificial material, which is removed after the reflective layer is formed. Without being limited by any theory, it is contemplated that especially for relatively large and/or deep reflective layers, confining the reflective flowable material may allow precise control of the size and shape of the reflective layer, and minimize spillage. In some embodiments, for a reflective layer having a thickness of at least 150 nm, confinement as described herein may be useful for controlling the shape of the reflective layer. Accordingly, in some embodiments, if the reflective layer has a thickness of at least 150 nm, for example, at least 150 nm, 180, 200, 220, 250, 270, 300, 320, 350, 370, 400, 420, 450, 470, 500, 520, 550, 570, or 600 nm, including ranges between any of the listed values, the reflective flowable material is applied to a confined area defined by a wall (e.g., dam, mold, or the like) as described herein. In some embodiments, the confined area (e.g., dam, mold, or the like) is defined by walls having a height that are at least the desired height of the reflective layer, for example walls of at least about 200 nm in height, for example, 200 nm, 220, 250, 270, 300, 320, 350, 370, 400, 420, 450, 470, 500, 520, 550, 570, 600, 620, 650, 670, 700, 720, 750, or 800 nm in height. Example confinement in accordance with some embodiments is illustrated in FIGS. 11A-B. As shown in the views of FIGS. 11A and 11B a fill area 100 for confinement of reflective flowable material may be provided. The fill area may be disposed on a substrate 105, such as a waveguide. The waveguide may comprise protrusions 106. The protrusions 106 may form an optical grating. The fill area may comprise one or more walls, 110, 111, 112, which may be of the same height or different heights. The walls 110, 111, 112, may be higher than the height of the desired reflective layer 120. In some embodiments, the walls 110, 111, 112 are of graded heights, in which at least one wall 110, 111, 112 higher than and defining an area larger than the reflective layer is provided. For example, if the reflective layer 120 has a height of about 150 nm, the walls 110, 111, 112 may have heights of 300 nm-700 nm. For example, if the reflective layer 120 has a diameter of about 200 nm, the walls 110, 111, 112 may define a diameter of about 300-500 nm. In some embodiments, the walls are of height such that they comprise mechanical spacers, which maintain mechanical separation between optical waveguides in a stack. As illustrated in FIG. 11B, such walls may define a transition confinement zone around the desired fill area for the reflective layer. The transition confinement zone may facilitate filling during the making of the reflective layer from reflective flowable material. In some embodiments, the walls 110, 111, and/or 112 further act as spacers between the substrate 105 and other substrates, for example additional waveguides in a stack. For example, the additional waveguide can be positioned on the walls 110, 111, and/or 112 so as to space the additional waveguide from the substrate 105.

In some embodiments, the reflective flowable material is deposited on a first surface, for example a surface on a waveguide having a plurality of protrusions. In some embodiments, the reflective flowable material is deposited conformally on the protrusions. In some embodiments, the first surface comprises a non-planar configuration. In some embodiments, the first surface comprises a grating, such as a diffractive grating, or faceted features. The grating may be in a variety of configurations, for example binary, blazed, multilayer, undercut, or metamaterial or metasurface. In some embodiments, the reflective layer is deposited conformally, and the thickness of the reflective layer above the surface varies by no more than about ±20%, so that across the entire reflective layer, the thickness is within about ±20% of a mean, for example within about ±20%, ±15%, ±10%, ±5%, or ±1% of the mean.

In some embodiments, the reflective layer is configured to reflect incident electromagnetic radiation (e.g., light in the visible spectrum). In some embodiments, the interface is configured to reflect incident electromagnetic radiation (e.g., light in the visible spectrum) at the interface into the first waveguide with a reflectivity of at least about 40%, for example at least about 40%, 45%, 50%, 55%, 60%, 65%, 70%, 75%, 80%, 85%, 90%, 95%, or 99% of a reference, including ranges between any two of the listed values, for example about 30%-99%, 30%-95%, 30%-90%, 30%-80%, 40%-99%, 40%-95%, 40%-90%, 40%-80%, 50%-99%, 50%-95%, 50%-90%, 50%-80%, 60%-99%, 60%-95%, 60%-90%, 60%-80%, 70%-99%, 70%-95%, 70%-90%, or 70%-80%. The percent reflection of incident electromagnetic radiation (e.g. light of the visible spectrum) may be with reference to a material comprising just the metal or metals of the reflective layer in some embodiments. The reference for reflectivity may be aluminum in some embodiments.

In some embodiments, the reflective layer is formed on an optical waveguide that is part of a stack of optical waveguides as described herein. In some embodiments, the reflective layer is formed on a first optical waveguide, and at least one optical waveguides are then attached to the first optical waveguide and/or to each other, so as to form a stack of optical waveguides. For example, forming the stack may comprise depositing additional optical waveguides. For example, forming the stack may comprise contacting optical waveguides to each other. In some embodiments, the optical waveguides of the stack may be in optical communication with each other as described herein.

Furthermore, the conventional process described above may involve the additional steps of making a particular hard mask for each particular pattern of reflective layer to be applied. In contrast to such conventional processes, methods as described herein do not require making a hard mask, and thus, different patterns may readily be applied to different surfaces. Furthermore, methods of making optical waveguides comprising reflective layers as described herein may be performed in the deposition chamber in which the waveguide is made, thus eliminating the need to move the waveguide in and/or out of the deposition chamber, thus increasing the efficiency of the process flow.

It is contemplated that in order to obtain a reflective layer of desired thickness, in some embodiments, methods may comprise repeating one a cycle of depositing an applying reflective flowable material multiple times, for example about 1, 2, 3, 4, 5, 6, 7, 8, 9, 10, 11, 12, 13, 14, 15, 16, 17, 18, 19, 20, 30, 40, or 50 times, including ranges between any two of the listed values.

Methods of Making Display Devices

In some embodiments, methods of making a display device are provided. The method may comprise making an optical waveguide or optical waveguide structure (e.g. an optical waveguide structure comprising an optical waveguide stack) comprising a reflective optical element as described herein. The method may comprise disposing an optical waveguide or stack of optical waveguides in a display device as described herein. In some embodiments, the method comprises disposing an optical waveguide or optical waveguide stack comprising a first waveguide comprising the reflective optical element as described herein in a display device. In some embodiments, the display device comprises an orthogonal pupil expander or exit pupil expander comprising the first optical waveguide comprising the reflective optical element, or comprising a stack of waveguides comprising the first optical waveguide comprising the reflective optical element.

In some embodiments, the method comprises making a waveguide comprising a reflective optical element according to methods as described herein, and disposing the waveguide in the display device. In some embodiments, the method comprises making an optical waveguide stack comprising the first waveguide comprising a reflective optical element according to methods as described herein, and disposing the optical waveguide stack in the display device Example 1: Making Reflective Layers from Reflective Ink Reflective inks comprising aluminum were patterned on a substrate using an applicator rod, and allowed to set, so as to form a reflective layer on the substrate. The reflectivity of the reflective inks compared to a pure aluminum reflective layer (formed by evaporation) were compared, as summarized in Table 1, below:

TABLE 1

| Ink | Coating Method | Bake Temp | Bake Type | Bake Time | Intensity | Intensity (as a % compared to Pure Aluminum) |
|---|---|---|---|---|---|---|
| Evaporated Al | — | — | — | — | 3.9 | 100 |
| 60B2NSP | bar, thick | air dry | None | None | 2.41 | 61.4 |
|  | bar, thick | 140° C. | Hot plate | 10 min | Too much | Light transmission |
| 60B1EPS100 | bar, thick | air dry | None | None | 2.68 | 68.7 |
|  | bar, thick | 140° C. | Hot plate | 10 min | Too much | Light transmission |
|  | 3x >2 mil wet | 140° C. | Oven, slow | >5 min after 1 hr dry | 2.19 | 56.2 |
|  | 1x 1 mil wet | 140° C. | Oven, slow | >5 min after 1 hr dry | 1.65 | 42.3 |
| 45B10FLX5 | bar, thick | air dry | None | None | 1.83 | 46.9 |
| 45B5SQM5 | bar, thick | air dry | None | None | 1.585 | 40.6 |
|  | 2x 1.5 mil wet | 140° C. | Oven, slow | >5 min after 1 hr dry | 1.64 | 42.1 |
|  | 3x >2 mil wet | 140° C. | Oven, slow | >5 min after 1 hr dry | 1.41 | 36.2 |
| NG23 | 3x >2 mil wet | 140° C. | Oven, slow | >5 min after 1 hr dry | 2.79 | 71.5 |
| 45B10K p100 | 1x 1 mil wet | 140° C. | Oven, slow | >5 min after 1 hr dry | 1.36 | 34.9 |
|  | 1x 0.5 mil wet | 140° C. | Oven, slow | >5 min after 1 hr dry | 1.52 | 39.0 |
|  | 2x 1.5 mil wet | 140° C. | Oven, slow | >5 min after 1 hr dry | 1.85 | 47.4 |
|  | 3x >2 mil wet | 140° C. | Oven, slow | >5 min after 1 hr dry | 1.4 | 35.9 |

As shown in Table 1, many of the inks achieved at least 30% of the reflectivity of evaporated aluminum, and a number achieved substantially more than 30%. For example, NG23 ink achieved a reflectivity of over 70% of evaporated Al. Without being limited by theory, it is contemplated that further refinements to ink selection, setting or curing conditions, and clean room fabrication may achieve even higher reflectivity than those shown below. In some embodiments, a reflective ink comprising silver has a reflectivity that matches, or exceeds that of vacuum-deposited Al (see, e.g., Example 2, below).

Example 2: Reflectivity of Electron Inks

A type of reflective ink, electron ink containing silver in a chemical species having the formula Ag(NH3)2|+ |C2H3O2|− was deposited on a flat surface. This ink is described in Walker et al., "Reactive Silver Inks for Patterning High-Conductivity Features at Mild Temperatures", J. Am. Chem. Society 134: 1419-1421, the disclosure of which is incorporated herein by reference. For comparison, two different samples of evaporated aluminum (E1 and E2), were measured on resist, and on flat glass ("off resist"). The reflectivities were measured. The reflectivity of the electron ink was measured in four random spots, and compared to that of the evaporated aluminum on (E2) or off (E1) resist. The results are shown in Table 2.

TABLE 2

| Ink tested | Input Power (W) | Reflected Power (W) | % Reflected |
|---|---|---|---|
| EI Sample 2 | 5.62 | 5.22 | 92.9 |
| EI Sample 2 | 5.6 | 4.6 | 82.1 |
| EI Sample 2 | 5.6 | 4.7 | 83.9 |
| EI Sample 2 | 5.66 | 4.9 | 86.6 |
| EI Sample 2 (AVG of 4 lines above) | 5.6 | 4.9 | 86.4 |
| E1 Flat field (off resist) | 5.66 | 5 | 88.3 |
| E2 flat field (on resist) | 5.66 | 5.1 | 90.1 |

As shown in Table 2 above, the reflective inks ("EI Sample 2") consistently yielded 80-90% reflectivity, which was similar to or higher than the evaporated aluminum references (E1 and E2). Thus, the data show that the reflectivity of the reflective inks in accordance with some embodiments herein is comparable or superior to evaporated aluminum.

In the foregoing specification, various specific embodiments have been described. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:
1. An optical device comprising:
   an optical waveguide structure comprising:
      an incoupling optical element configured to redirect incident light at angles such that the incident light propagates through the optical waveguide structure by total internal reflection, wherein the incoupling optical element comprises:
a diffractive optical grating structure comprising:
a plurality of protrusions; and
a reflective layer on surfaces of the protrusions, and
wherein at least one parameter of the reflective layer varies across an area occupied by the plurality of protrusions, and
wherein a reflectivity of the diffractive optical grating structure varies with the at least one parameter of the reflective layer across the area occupied by the plurality of protrusions.

2. The optical device of claim 1, wherein the at least one parameter is a thickness of the reflective layer across the area occupied by the plurality of protrusions.

3. The optical device of claim 2, wherein the thickness of the reflective layer varies by 25% or more across the area occupied by the plurality of protrusions.

4. The optical device of claim 1, wherein the at least one parameter is a composition of the reflective layer across the area occupied by the plurality of protrusions.

5. The optical device of claim 1, wherein the at least one parameter is the coverage over the reflective layer, and wherein the reflective layer covers less than an entirety of the area occupied by the plurality of protrusions.

6. The optical device of claim 1, wherein the reflective layer comprises metal.

7. The optical device of claim 6, wherein the metal is a liquid metal.

8. The optical device of claim 7, wherein the liquid metal is selected from the group consisting of: gallium; indium; mercury; gallium-indium eutectic; gallium-indium alloy; gallium indium tin alloy; Ga, In, Sn and Zn alloy; Ga, In, and Sn alloy; sodium-potassium alloy; gallium, indium and stannum; gallium-indium-zinc-copper metallic; and silver indium gallium.

9. The optical device of claim 6, wherein the metal forms a reflective ink.

10. The optical device of claim 9, wherein the metal is aluminum, silver, or a combination thereof.

11. The optical device of claim 9, wherein the reflective ink is a particle-free ink.

12. The optical device of claim 1, wherein the optical waveguide structure comprises a first waveguide configured to propagate light therein by total internal reflection.

13. The optical device of claim 12, wherein the optical waveguide structure comprises at least one additional waveguide, wherein the first waveguide and the at least one additional waveguide form a waveguide stack.

14. The optical device of claim 13, wherein the area occupied by the diffractive optical grating is delineated by walls or barriers on the surface of the optical waveguide structure, wherein the walls or barriers extend vertically to a height above the plurality of protrusions, and wherein the walls or barriers are configured to function as spacers to provide a gap between the first waveguide and the at least one additional waveguide in the stack of waveguides.

15. The optical device of claim 13, wherein the diffractive optical grating structure is configured to incouple the incident light into the first waveguide, and wherein the at least one additional waveguide has associated additional incoupling optical elements.

16. The optical device of claim 15, wherein the incoupling optical element and the additional incoupling optical elements are configured to incouple light of different ranges of wavelengths.

17. The optical device of claim 13, wherein the waveguide stack is optically coupled to a spatial light modulator, wherein the spatial light modulator is configured to inject light into the waveguide stack.

18. The optical device of claim 13, wherein the first waveguide and the at least one additional waveguide each comprise associated outcoupling optical elements, wherein the respective associated outcoupling optical elements are configured to redirect light out of the first waveguide and the at least one additional waveguide with different amounts of wavefront divergence.

19. The optical device of claim 13, wherein the incoupling optical element and the additional incoupling optical elements are laterally offset from one another in a top-down view.

20. The optical device of claim 13, wherein the optical device is an augmented reality display, wherein the first waveguide and the at least one additional waveguide are configured to transmit light from an ambient environment.

21. The optical device of claim 1, further comprising an image injection device configured to direct light with image information to the incoupling optical element.

* * * * *